US011361771B2

(12) United States Patent
Lee et al.

(10) Patent No.: US 11,361,771 B2
(45) Date of Patent: Jun. 14, 2022

(54) METHOD FOR TRANSMITTING/RECEIVING AUDIO DATA AND DEVICE THEREFOR

(71) Applicant: LG ELECTRONICS INC., Seoul (KR)

(72) Inventors: Tungchin Lee, Seoul (KR); Sejin Oh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 16/631,271

(22) PCT Filed: Sep. 21, 2018

(86) PCT No.: PCT/KR2018/011252
§ 371 (c)(1),
(2) Date: Jan. 15, 2020

(87) PCT Pub. No.: WO2019/059716
PCT Pub. Date: Mar. 28, 2019

(65) Prior Publication Data
US 2020/0211574 A1     Jul. 2, 2020

Related U.S. Application Data

(60) Provisional application No. 62/561,689, filed on Sep. 22, 2017.

(51) Int. Cl.
*G10L 19/00* (2013.01)
*H04L 65/61* (2022.01)
(Continued)

(52) U.S. Cl.
CPC .......... *G10L 19/00* (2013.01); *H04L 65/4069* (2013.01); *H04L 65/601* (2013.01); *H04R 5/04* (2013.01)

(58) Field of Classification Search
CPC ... G10L 19/00; G10L 19/167; H04L 65/4084; H04L 65/4069; H04L 65/601;
(Continued)

(56) References Cited

U.S. PATENT DOCUMENTS

2018/0020312 A1 * 1/2018 Visser .................... G06F 3/017

FOREIGN PATENT DOCUMENTS

KR    10-2014-0128567    11/2014
KR    10-2016-0005695    1/2016
(Continued)

OTHER PUBLICATIONS

PCT International Application No. PCT/KR2018/011252, International Search Report dated Jan. 8, 2019, 2 pages.
(Continued)

*Primary Examiner* — Yogeshkumar Patel
(74) *Attorney, Agent, or Firm* — Lee, Hong, Degerman, Kang & Waimey PC

(57) ABSTRACT

A method for processing audio data by an audio processing device according to the present disclosure comprises the steps of: receiving, from an audio reproduction device, information on reproduction environment of the audio reproduction device; generating an audio signal by processing an audio bitstream on the basis of the information on reproduction environment; generating an InfoFrame including characteristic information of the generated audio signal; and transmitting the generated audio signal and the generated InfoFrame to the audio reproduction device, wherein the audio bitstream includes a virtual reality (VR) audio bitstream or an augmented reality (AR) audio bitstream.

20 Claims, 16 Drawing Sheets

(51) Int. Cl.
*H04L 65/60* (2022.01)
*H04R 5/04* (2006.01)

(58) Field of Classification Search
CPC ......... H04L 65/604; H04R 5/04; H04R 3/008;
H04S 7/302; H04S 7/303; H04S 7/304;
H04S 7/306; G06F 3/011; G06F 3/165;
G02B 27/01; G02B 2027/014; G02B
2027/0141; G06T 19/006; G06K 9/00664
See application file for complete search history.

(56) References Cited

FOREIGN PATENT DOCUMENTS

| KR | 10-1627247 | | 6/2016 |
|---|---|---|---|
| KR | 10-2017-0069790 | | 6/2017 |
| KR | 20170069790 A | * | 6/2017 |

OTHER PUBLICATIONS

Jeong Hun Seo et al., "The Completion of Virtual Reality, Virtual Reality Audio," Engineering Education, vol. 23, No. 3, Sep. 30, 2016, pp. 12-16, 9 pages.

* cited by examiner

FIG. 8B
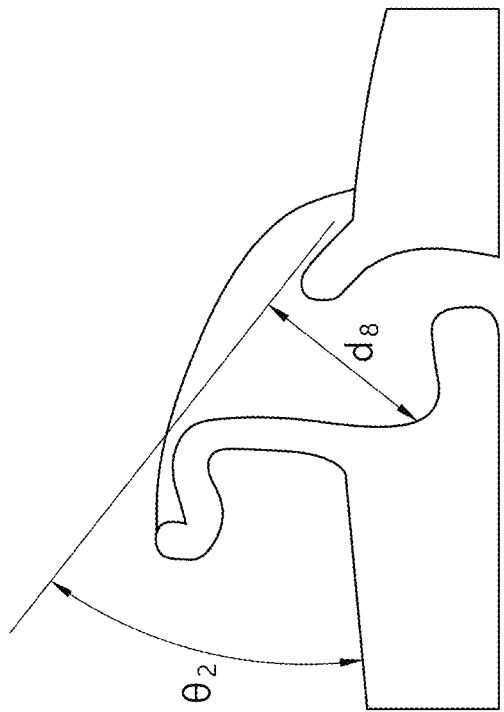
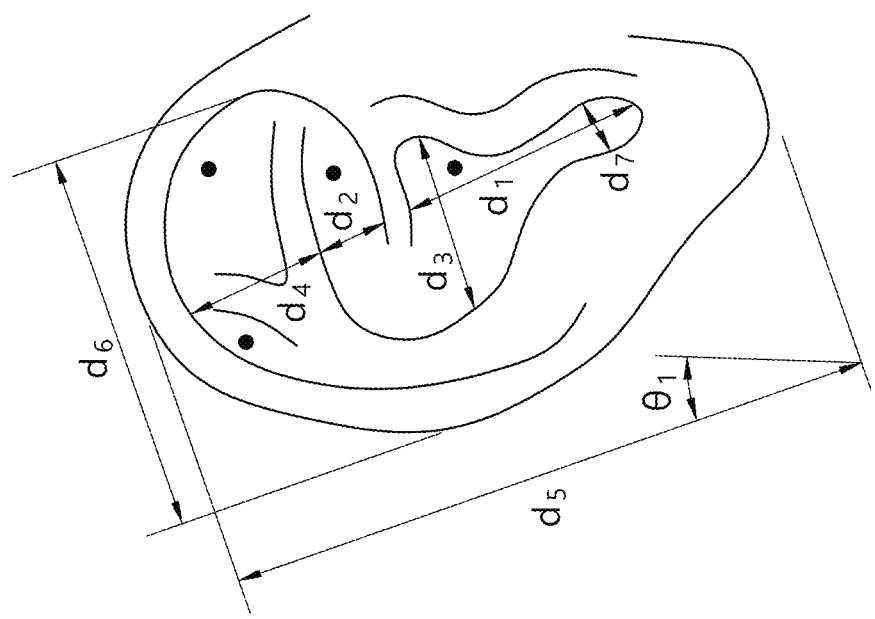
$d_1$-PINN1 :
$d_2$-PINN2 :
$d_3$-PINN3 :
$d_4$-PINN4 :
$d_5$-PINN5 :
$d_6$-PINN6 :
$d_7$-PINN7 :
$d_8$-PINN8 :
$\theta_2$-PINN9 :
$\theta_1$-PINN10 :

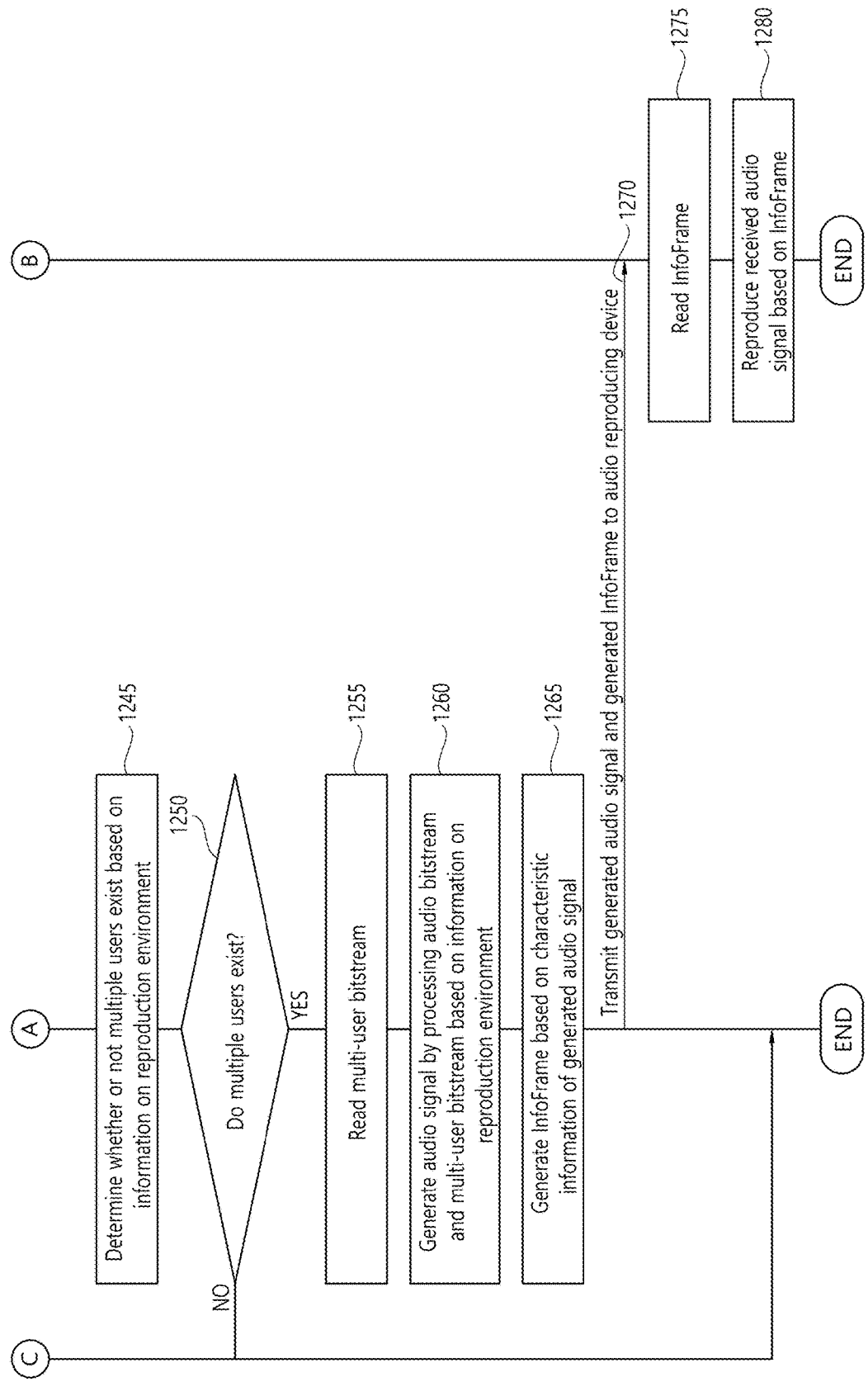

FIG. 13

| | Byte# | Bits 5-7 | Bits 0-4 |
|---|---|---|---|
| Video Data Block | 1 | Video Tag Code | length=total number of video bytes following this byte ($L_1$) |
| | 2 | CTA Short Video Descriptor 1 | |
| | 3 | CTA Short Video Descriptor 2 | |
| | ... | | |
| | $1+L_1$ | CTA Short Video Descriptor $L_1$ | |
| Audio Data Block | $2+L_1$ | Audio Tag Code | length=total number of audio bytes following this byte ($L_2$) |
| | $3+L_1$ | | |
| | $4+L_1$ | CTA Short Audio Descriptor 1 | |
| | $5+L_1$ | | |
| | ... | | |
| | $L_1+L_2$ | | |
| | $1+L_1+L_2$ | CTA Short Audio Descriptor $L_2/3$ | |
| | $2+L_1+L_2$ | | |
| Speaker Allocation Data Block | $3+L_1+L_2$ | Speaker Allocation Tag Code | length=total number of speaker allocation bytes following this byte ($L_3$=3) |
| | $4+L_1+L_2$ | Speaker Allocation Data Block Payload (3 bytes) | |
| | $5+L_1+L_2$ | | |
| | $6+L_1+L_2$ | | |
| Vendor-Specific Data Block | $7+L_1+L_2$ | Vendor-Specific Tag Code | length=total number of Vendor-Specific bytes following this byte ($L_4$) |
| | $8+L_1+L_2$ | IEEE OUI third two hex digits | |
| | $9+L_1+L_2$ | IEEE OUI second two hex digits | |
| | $10+L_1+L_2$ | IEEE OUI first two hex digits | |
| | ... | Vendor-Specific Data Block Payload ($L_4$-3 bytes) | |
| Video Capability Data Block | $8+L_1+L_2+L_4$ | Extended Tag Code | length=total number of bytes in this block following this byte ($L_5$) |
| | $9+L_1+L_2+L_4$ | Video Capabilities Ext. Tag Code = 00h | |
| | $10+L_1+L_2+L_4$ | Video Capabilities Data Byte 3 (see Section 7.5.6) | |
| AR/VR Data Block | $9+L_1+L_2+L_4+L_5$ | Extended Tag Code | length=total number of bytes in this block following this bytes ($L_6$) |
| | $10+L_1+L_2+L_4+L_5$ | AR/VR Ext. Tag Code = 16h | |
| | ... | AR/VR Data Block Payload ($L_6$) | |

METHOD FOR TRANSMITTING/RECEIVING AUDIO DATA AND DEVICE THEREFOR

CROSS-REFERENCE TO RELATED APPLICATIONS

This application is the National Stage filing under 35 U.S.C. 371 of International Application No. PCT/KR2018/011252, filed on Sep. 21, 2018, which claims the benefit of U.S. Provisional Application No. 62/561,689, filed on Sep. 22, 2017, the contents of which are all hereby incorporated by reference herein in their entirety.

BACKGROUND OF THE DISCLOSURE

Field of the Disclosure

The present disclosure relates to audio data and, most particularly to a method for transmitting/receiving 3-dimensional audio data and a device therefor.

Related Art

A virtual reality (VR) system provides a user with sensory experiences through which the user may feel as if he/she were in an electronically projected environment. An Augmented Reality (AR) system overlay a three-dimensional (3D) virtual image on an actual image or background of a real world, thereby allowing a user to feel as if the user is placed in an environment where a virtual reality and the real word are mixed. A system for providing VR may be further improved in order to provide higher-quality images and spatial sound. The VR or AR system may enable the user to interactively enjoy VR or AR content.

In a situation where demand for VR or AR contents is increasing, the need for devising a device (or apparatus) for generating audio signals for reproducing VR or AR contents and a method for efficiently transmitting and receiving audio data between devices (or apparatuses) reproducing VR or AR contents is also increasing.

SUMMARY OF THE DISCLOSURE

Technical Objects

A technical object of the present disclosure is to provide a method for transmitting/receiving audio data and a device therefor.

Another technical object of the present disclosure is to provide an audio processing device generating audio signals while transmitting/receiving audio data to/from an audio reproducing device, and an operating method therefor.

Another technical object of the present disclosure is to provide an audio reproducing device reproducing audio signals while transmitting/receiving audio data to/from an audio processing device, and an operating method therefor.

Another technical object of the present disclosure is to provide a method and device for transmitting/receiving 3-dimensional (3D) audio data.

Another technical object of the present disclosure is to provide an audio processing device generating 3D audio signals while transmitting/receiving 3D audio data to/from an audio reproducing device and an operating method therefor.

Another technical object of the present disclosure is to provide an audio reproducing device reproducing 3D audio signals while transmitting/receiving 3D audio data to/from an audio processing device and an operating method therefor.

Technical Solutions

According to an embodiment of the present disclosure, provided herein is an audio data processing method performed by an audio processing device. The method may include the steps of receiving information on a reproduction environment of an audio reproducing device from the audio reproducing device, generating an audio signal by processing an audio bitstream based on the information on reproduction environment, generating an info frame including characteristic information of the generated audio signal, and transmitting the generated audio signal and the generated info frame to the audio reproducing device, wherein the audio bitstream includes a Virtual Reality (VR) audio bitstream or an Augmented Reality (AR) audio bitstream.

According to another embodiment of the present disclosure, provided herein is an audio data reproducing method performed by an audio reproducing device. The method may include the steps of generating information on a reproduction environment of the audio reproducing device, transmitting the generated information on a reproduction environment to an audio processing device, receiving an audio signal being generated by processing an audio bitstream, by an audio processing device, based on the information on a reproduction environment and an info frame being generated, by the audio processing device, based on characteristic information of the generated audio signal, from the audio processing device, and reproducing the received audio signal based on the info frame, wherein the audio bitstream includes a Virtual Reality (VR) audio bitstream or an Augmented Reality (AR) audio bitstream.

According to another embodiment of the present disclosure, provided herein is an audio processing device processing audio data. The audio processing device may include a receiver receiving information on a reproduction environment of an audio reproducing device from the audio reproducing device, an audio signal processor generating an audio signal by processing an audio bitstream based on the information on reproduction environment, a metadata processor generating an info frame including characteristic information of the generated audio signal, and a transmitter transmitting the generated audio signal and the generated info frame to the audio reproducing device, wherein the audio bitstream includes a Virtual Reality (VR) audio bitstream or an Augmented Reality (AR) audio bitstream.

According to another embodiment of the present disclosure, provided herein is an audio reproducing device reproducing audio data. The audio reproducing device may include a metadata processor generating information on a reproduction environment of the audio reproducing device, a transmitter transmitting the generated information on a reproduction environment to an audio processing device, a receiver receiving an audio signal being generated by processing an audio bitstream, by an audio processing device, based on the information on a reproduction environment and an info frame being generated, by the audio processing device, based on characteristic information of the generated audio signal, from the audio processing device, and a reproducer reproducing the received audio signal based on the info frame, wherein the audio bitstream includes a Virtual Reality (VR) audio bitstream or an Augmented Reality (AR) audio bitstream.

EFFECTS OF THE DISCLOSURE

According to the present disclosure, a solution for efficiently transmitting/receiving 3D audio data by an audio processing device and an audio reproducing device may be provided.

According to the present disclosure, a solution for efficiently transmitting/receiving VR or AR audio data by an audio processing device and an audio reproducing device may be provided.

According to the present disclosure, a solution for generating a VR or AR audio signal, by an audio processing device, for a more efficient reproduction performed by an audio reproducing device based on information on the reproduction environment of the audio reproducing device, which is received from the audio reproducing device, may be provided.

According to the present disclosure, a solution for efficiently reproducing a VR or AR audio signal, by an audio reproducing device, based on characteristic information of the VR or AR audio signal being obtained during a process of generating a VR or AR audio signal by processing a VR or AR audio bitstream, which is received from an audio processing device, may be provided.

BRIEF DESCRIPTION OF THE DRAWINGS

FIG. 8a and FIG. 8b show examples of obtaining information on a reproduction environment of an audio reproducing device according to an embodiment of the present disclosure.

FIG. 12a and FIG. 12b are flow charts showing processes of transmitting and receiving audio data by an audio reproducing device, in a multi-user environment, according to an embodiment of the present disclosure.

FIG. 13 shows information on the reproduction environment of the audio reproducing device.

DESCRIPTION OF THE BEST EXEMPLARY EMBODIMENT

Figure 1:
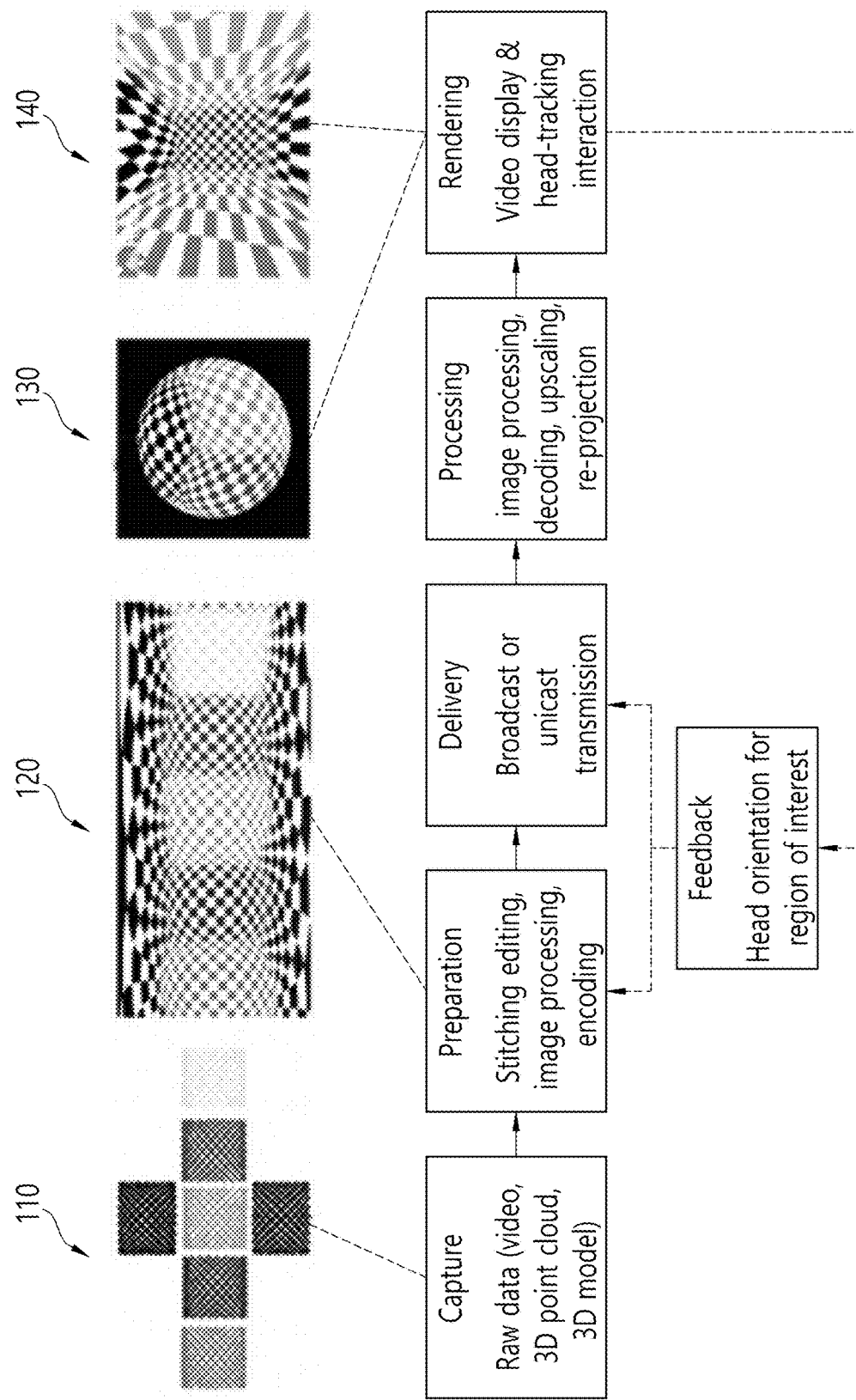
FIG. 1 is a diagram showing an overall architecture for providing 360 contents according to an embodiment of the present disclosure.

According to an embodiment of the present disclosure, provided herein is an audio data processing method performed by an audio processing device. The method may include the steps of receiving information on a reproduction environment of an audio reproducing device from the audio reproducing device, generating an audio signal by processing an audio bitstream based on the information on reproduction environment, generating an info frame including characteristic information of the generated audio signal, and transmitting the generated audio signal and the generated info frame to the audio reproducing device, wherein the audio bitstream includes a Virtual Reality (VR) audio bitstream or an Augmented Reality (AR) audio bitstream.

DESCRIPTION OF EXEMPLARY EMBODIMENTS

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, preferred embodiments of the present disclosure will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 contents according to an embodiment of the present disclosure.

In order to provide a user with Virtual Reality (VR), a scheme for 360 content provision may be considered. Here, the 360-degree content may be called a three Degrees of Freedom (3DoF) contents, and VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360 video may refer to a 360 degree video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data (110) shown in FIG. 1 may be generated through the capture process. Each plane of (110) in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image (120) in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated by (130) in FIG. 1. The image/video indicated by (130) in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be obtained at a display process to a transmission side. Interactivity may be provided in enjoying the 360-degree video through the feedback process. In some embodiments, head orientation information, information about a viewport, which indicates the area that is being viewed by the user, and so on, may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e., the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel. An apparatus, such as a VR display, may extract a viewport area based on the position/orientation of the head of the user, a vertical or horizontal FOV that is supported by the apparatus, and so on.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present disclosure may have a file format based on ISO base media file format (ISO BMFF).

Figure 2:
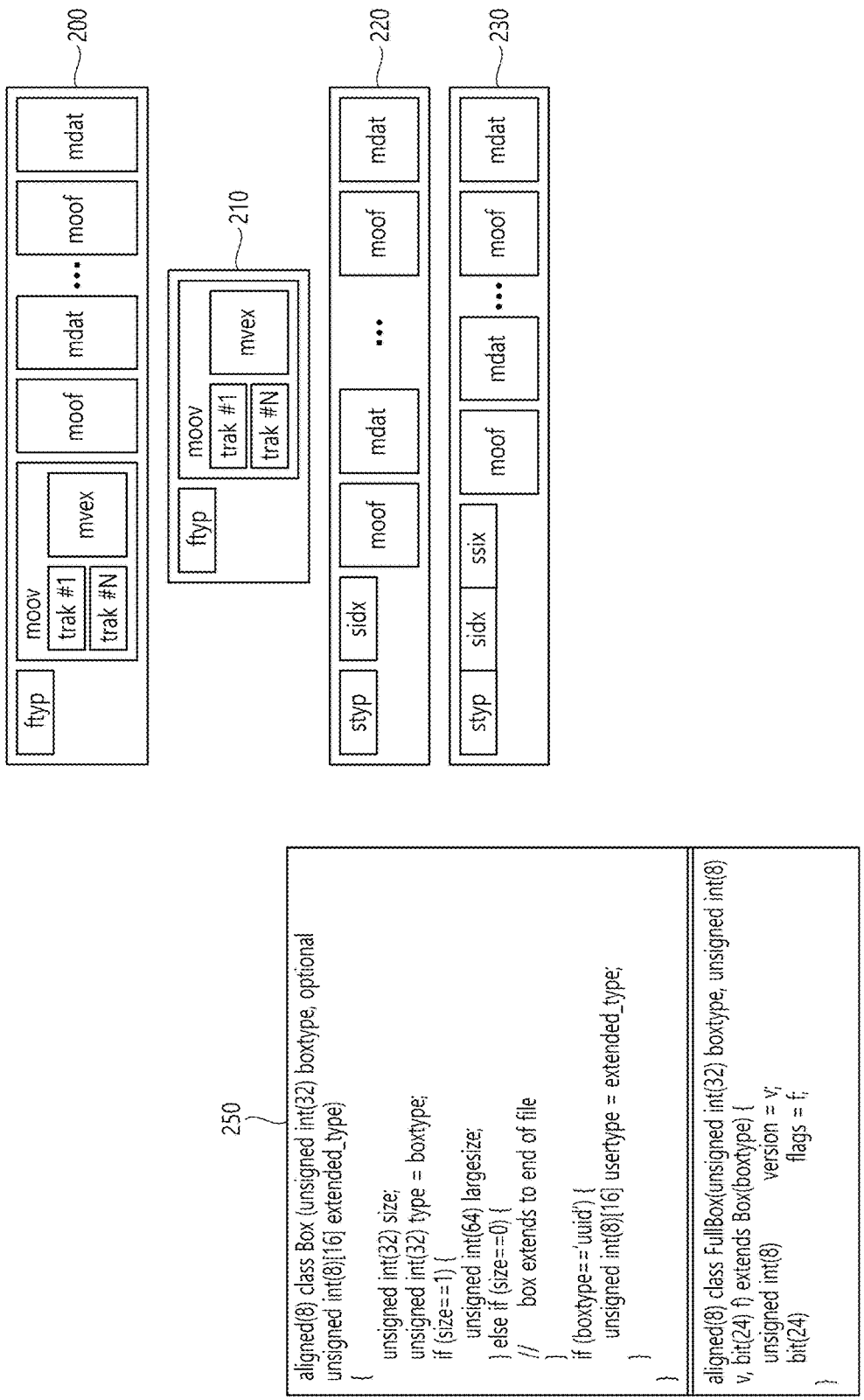
FIGS. 2 and 3 are diagrams illustrating the structure of a media file according to an embodiment of the present disclosure.
Figure 3:
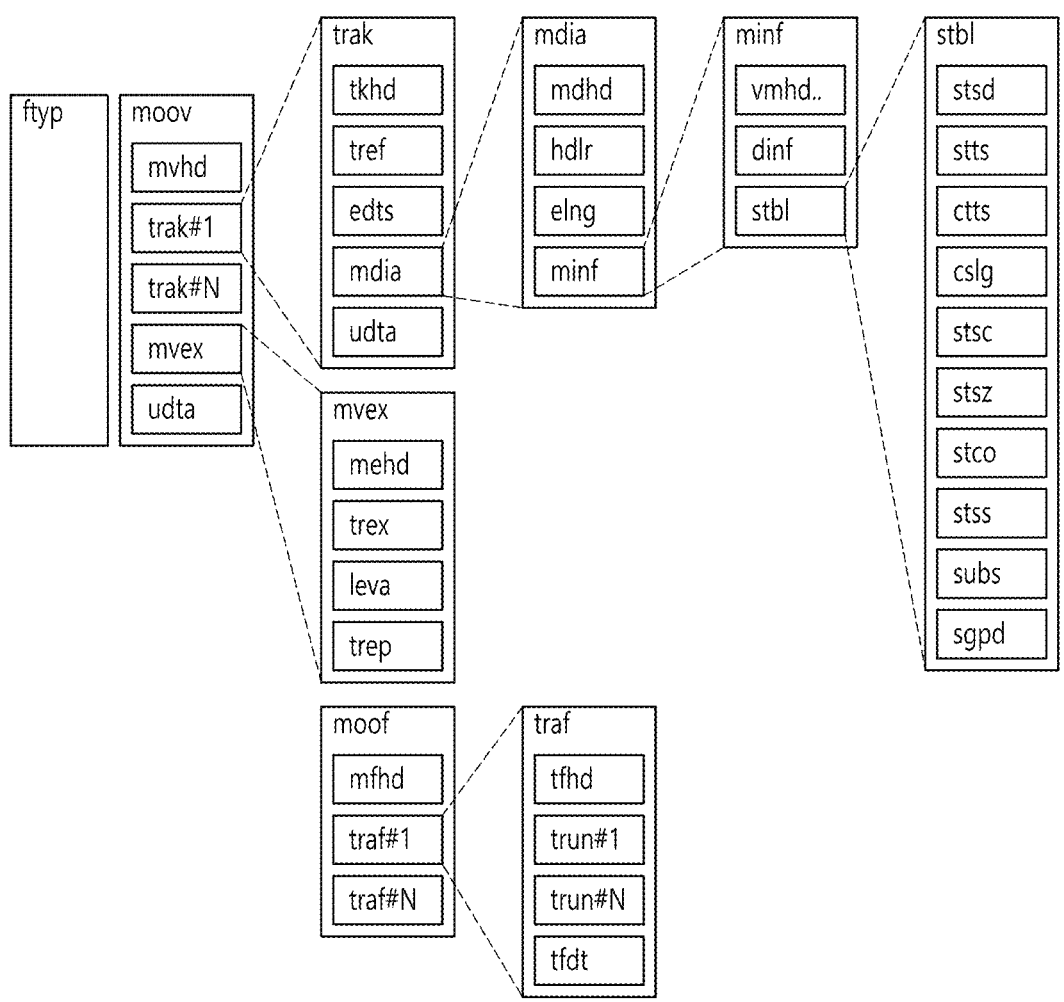

FIGS. 2 and 3 are diagrams illustrating the structure of a media file according to an embodiment of the present disclosure.

The media file according to an embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (210) may include information related to media decoder initialization except media data. This file may be the aforementioned initialization segment, for example. The initialization segment can include the aforementioned ftyp box and/or moov box.

A file of the illustrated embodiment (220) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (230), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (250). In the present embodiment, a size field and a largesize field can represent the length of the corresponding box in bytes. A version field can indicate the version of the corresponding box format. A type field can indicate the type or identifier of the corresponding box. A flags field can indicate a flag related to with the corresponding box.

Meanwhile, fields (properties) related to 360-degree video according to an embodiment of the present disclosure may be included in a DASH-based adaptive streaming model to be transmitted.

Figure 4:
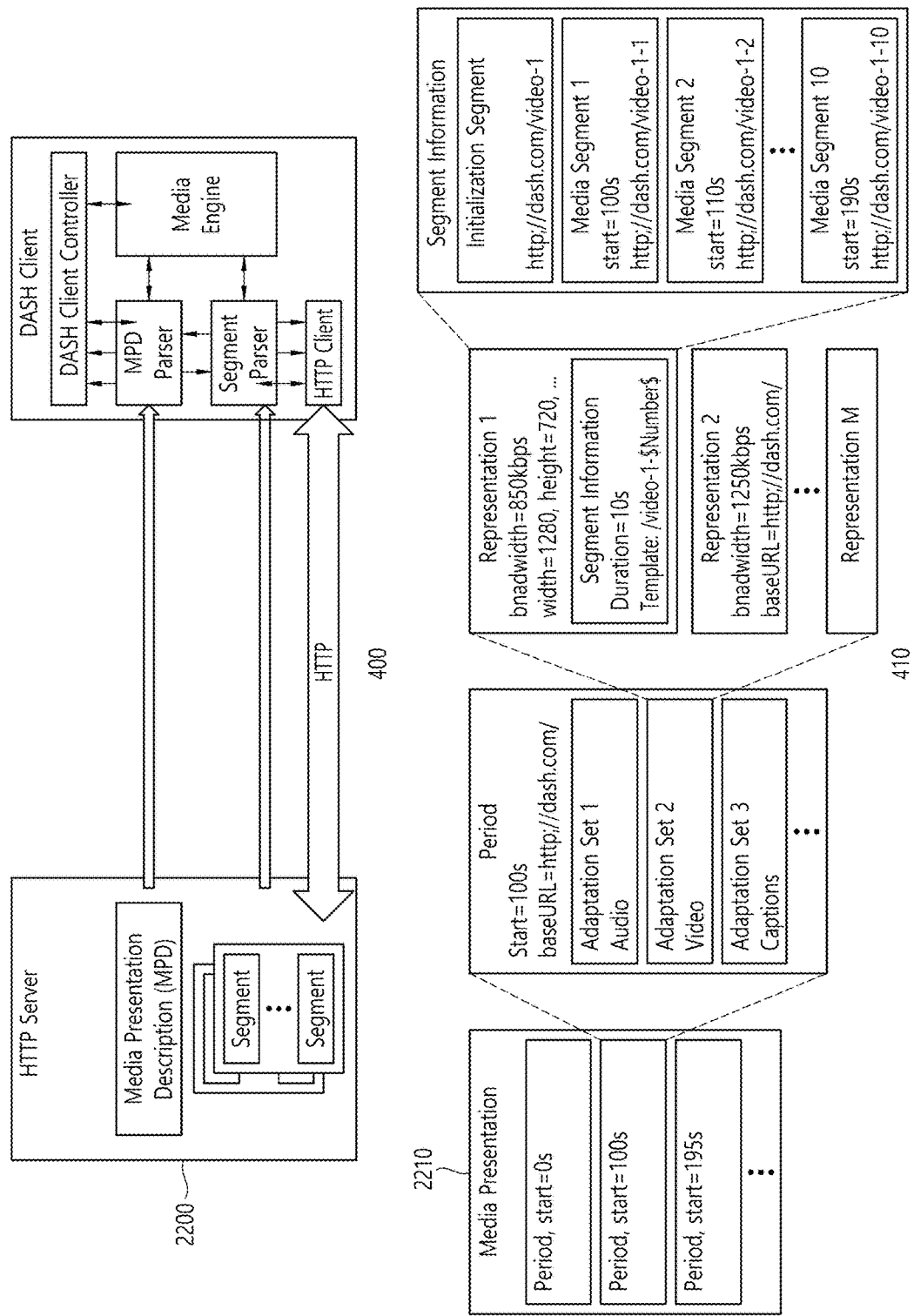
FIG. 4 is a diagram illustrating the overall operation of a DASH-based adaptive streaming model according to an embodiment of the present disclosure.

FIG. 4 is a diagram illustrating the overall operation of a DASH-based adaptive streaming model according to an embodiment of the present disclosure. A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may obtain MPD. The MPD may be delivered from a service provider such as an HTTP server. The DASH client may request a segment described in the MPD from the server using information about access to the segment. Here, this request may be performed in consideration of network conditions.

After obtaining the segment, the DASH client may process the segment using a media engine, and may display the segment on a screen. The DASH client may request and obtain a necessary segment in real-time consideration of reproduction time and/or network conditions (Adaptive Streaming). As a result, content may be reproduced without interruption.

Media Presentation Description (MPD) is a file including detailed information enabling the DASH client to dynamically obtain a segment, and may be expressed in the form of XML.

A DASH client controller may generate a command for requesting MPD and/or a segment in consideration of network conditions. In addition, this controller may perform control such that the obtained information can be used in an internal block such as the media engine.

An MPD parser may parse the obtained MPD in real time. In doing so, the DASH client controller may generate a command for obtaining a necessary segment.

A segment parser may parse the obtained segment in real time. The internal block such as the media engine may perform a specific operation depending on information included in the segment.

An HTTP client may request necessary MPD and/or a necessary segment from the HTTP server. In addition, the HTTP client may deliver the MPD and/or segment obtained from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Meanwhile, although the above-described description according FIG. 1 to FIG. 4 relates to the overall 3-dimensional (3D) video and 3D audio, which implement the VR or AR content, a process of processing the 3D audio data in relation to the embodiment of the present disclosure will hereinafter be described in more detail.

Figure 5:
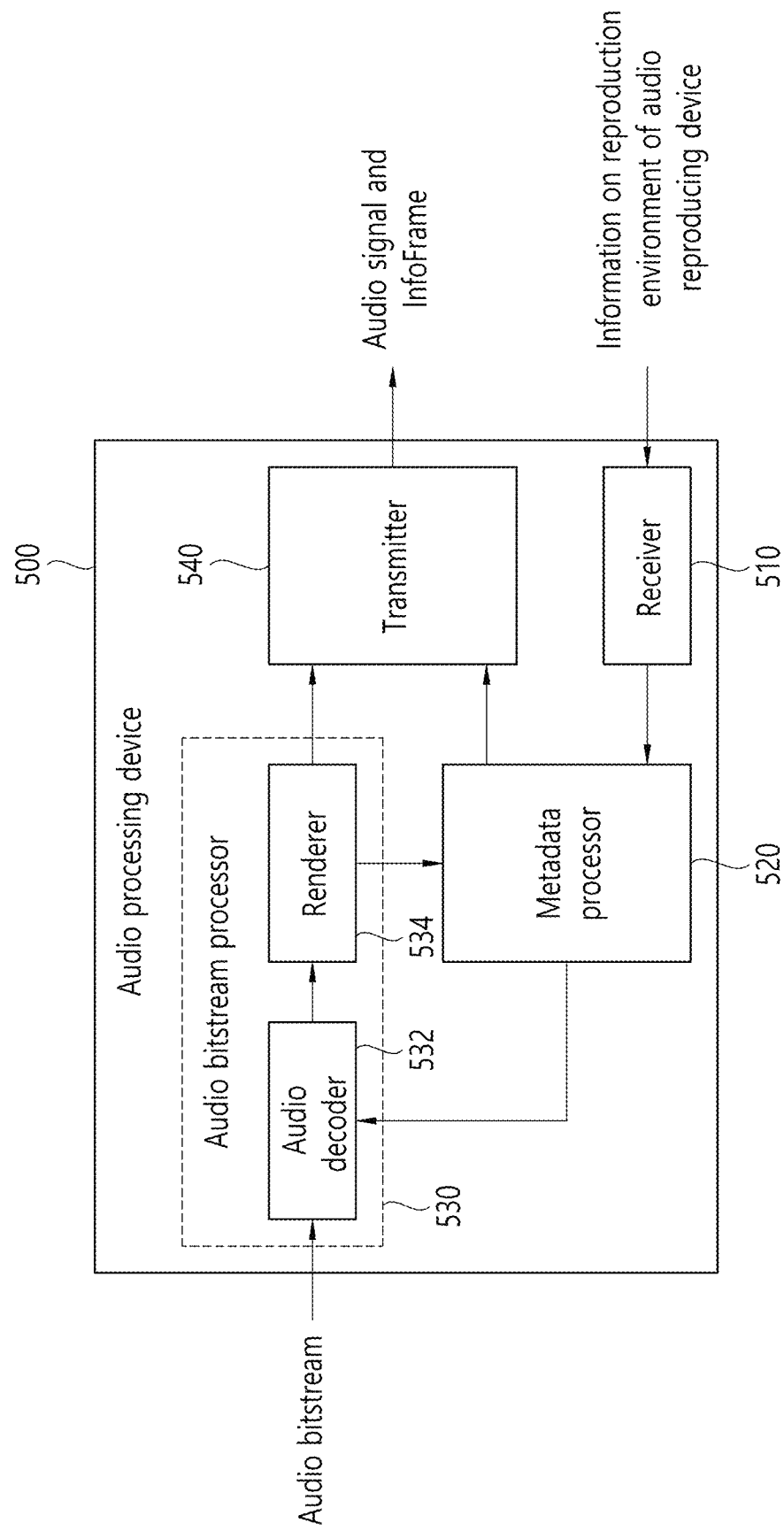
FIG. 5 is a block diagram showing a configuration of an audio processing device according to an embodiment of the present disclosure.

FIG. 5 is a block diagram showing a configuration of an audio processing device according to an embodiment of the present disclosure.

In this specification, an "audio processing device (500)" may mean a device performing audio signal processing, and, for example, examples of the "audio processing device (500)" may include a set-top box (STB), a Blu-ray player, a DVD player, a personal computer (PC), and so on, the "audio processing device (500)" will not be limited only to this. Audio signal processing may mean, for example, decoding of an audio bitstream, rendering of the decoded audio bitstream, and so on. However, audio signal processing will not be limited only to this.

Since the audio processing device (500) can perform audio signal processing by transmitting and/or receiving audio to and/or from an audio reproducing device, the audio processing device (500) and the audio reproducing device may be respectively referred to as a source device and a sink device. Detailed description of the audio reproducing device will be provided later on with reference to FIG. 6.

As shown in FIG. 5, the audio processing device (500) according to an embodiment of the present disclosure may include a receiver (510), a metadata processor (520), an audio bitstream processor (530), and a transmitter (540). However, not all of the configuration elements shown in FIG. 5 are the essential configuration elements of the audio processing device (500). The audio processing device (500) may also be embodied by a larger number or a smaller number of configuration elements as compared to the configuration elements shown in FIG. 5.

In the audio processing device (500) according to this embodiment, each of the receiver (510), the metadata processor (520), the audio bitstream processor (530), and the transmitter (540) may be embodied as a separate chip, or at least two or more configuration elements may be embodied through one chip.

The receiver (510) according to this embodiment may receive information on a reproduction environment of an audio reproducing device from the audio reproducing device. The information on the reproduction environment may indicate at least one of information on a status of the audio reproducing device and information on reproduction capability of the audio reproducing device. Most particularly, in the embodiment of the present disclosure, the information on the reproduction environment may mean information on a 3-dimensional (3D) reproduction environment. The information on the reproduction environment may include an Extended Display Identification Data (EDID) standard, and, in some cases, the information on the reproduction environment may mean the EDID. The EDID may include information related to sampling rate, compression or encoding (compression method, compression rate, and so on) of an audio signal, information on a speaker layout, information on speaker positioning of a channel signal, information on the processing of 3D audio data, and so on. Detailed information that may be included in the EDID will be described in more detail later on with reference to FIG. 9.

The metadata processor (520) according to this embodiment may read the information on the reproduction environment of the audio reproducing device (600) that is transferred from the receiver (510). The metadata processor (520) may transfer the information on the reproduction environment of the audio reproducing device (600) to the audio bitstream processor (530), so that the audio bitstream processor (530) can use the information on the reproduction environment of the audio reproducing device (600) during a process of processing an audio bitstream and generating an audio signal. Most particularly, the metadata processor (520) may transfer the information on the reproduction environment of the audio reproducing device (600) to an audio decoder (532), so that the audio decoder (532) can use the information on the reproduction environment of the audio reproducing device (600) during a process of decoding a 3D audio bitstream.

At this point, an audio bitstream may be delivered to the audio processing device (500) (most particularly, to the audio bitstream processor (530)) through a network, or the audio bitstream may be delivered to the audio processing device (500) from a digital storage medium. Herein, the network may include a broadcasting network and/or a communication network, and so on, and the digital storage medium may include various storage media, such as a Universal Serial Bus (USB), an SD, a Compact Disc (CD), a Digital Versatile Disc (DVD), Blu-ray, a Hard Disk Drive (HDD), a Solid State Drive (SSD), and so on.

Additionally, the metadata processor (520) may generate an InfoFrame based on an audio signal, which is generated by processing an audio bitstream in the audio bitstream processor (530). The InfoFrame may include sampling rate of the generated audio signal, bit size information of the generated audio signal, whether or not compression or decoding is performed, the compression method being used, a compression transmission rate, information for down mix, information for clipping prevention, characteristic information of the generated audio signal, and so on. The characteristic information of the generated audio signal is information that is obtained during a process of processing an audio bitstream based on the information on the reproduction environment of the audio reproducing device. And, detailed information that may be included in the characteristic information of the audio signal will be described in more detail later on with reference to FIG. 9.

The audio bitstream processor (530) according to this embodiment may include an audio decoder (532) and a renderer (534). However, not all of the configuration elements shown in FIG. 5 are the essential configuration elements of the audio bitstream processor (530). The audio bitstream processor (530) may also be embodied by a larger number or a smaller number of configuration elements as compared to the configuration elements shown in FIG. 5.

For example, although it is not shown in FIG. 5, the audio bitstream processor (530) may additionally include an equalizer. In case the information on the reproduction environment of the audio reproducing device includes room information (or room environment) of the audio reproducing device, the equalizer may perform equalization on the audio signal being transferred from the renderer (534) and may, then, enhance the sound quality being reproduced from the audio reproducing device, e.g., speaker. The room information (or room environment) of the audio reproducing device will be described in more detail later on with reference to FIG. 8a.

The audio decoder (532) according to this embodiment may decode the audio bitstream based on the information on the reproduction environment. More specifically, the audio decoder (532) may decode an audio bitstream that is obtained from an external source based on the information on the reproduction environment of the audio reproducing device, which is transferred from the metadata processor (520).

The renderer (534) according to this embodiment may render the decoded audio bitstream.

An audio signal, which is generated by decoding an audio bitstream by the audio decoder (532) and by rendering the decoded audio bitstream by the renderer (534), may be transferred from the audio bitstream processor (530) to the transmitter (540). In other words, the audio bitstream processor (530) may transfer the audio signal, which is generated by processing the audio bitstream, to the transmitter.

The transmitter (540) according to this embodiment may transmit the audio signal being generated in the audio bitstream processor (530) and the InfoFrame being generated in the metadata processor (520) to the audio reproducing device. The transmitter (540) may transmit the audio signal being generated in the audio bitstream processor (530) and the InfoFrame being generated in the metadata processor (520) to the audio reproducing device simultaneously or sequentially with a predetermined time difference. Alternatively, the transmitter (540) may transmit an audio signal to the audio reproducing device after a predetermined elapse of time since the audio signal is generated in the audio bitstream processor (530), and, then, the transmitter (540) may transmit an InfoFrame to the audio reproducing device after a predetermined elapse of time since the InfoFrame is generated in the metadata processor (520). As described above, it shall be easily understood by anyone skilled in the art that the time points at which the audio signal and InfoFrame of the audio processing device (500) are transmitted to the audio reproducing device may be variously defined.

According to the audio processing device (500), which is described above in FIG. 5, a 3D audio signal may be generated by processing an audio bitstream based on the information on the 3D reproduction environment of an audio reproducing device that is received from the audio reproducing device, and an InfoFrame may be generated based on characteristic information of the 3D audio signal being obtained during a process of processing the audio bitstream, and the generated 3D audio signal and the generated InfoFrame may be transmitted to the audio reproducing device. More specifically, by transmitting/receiving 3D audio data to/from the audio reproducing device, the audio processing device (500) may generate a 3D audio signal enabling the audio reproducing device to more smoothly reproduce 3D audio content.

Figure 6:
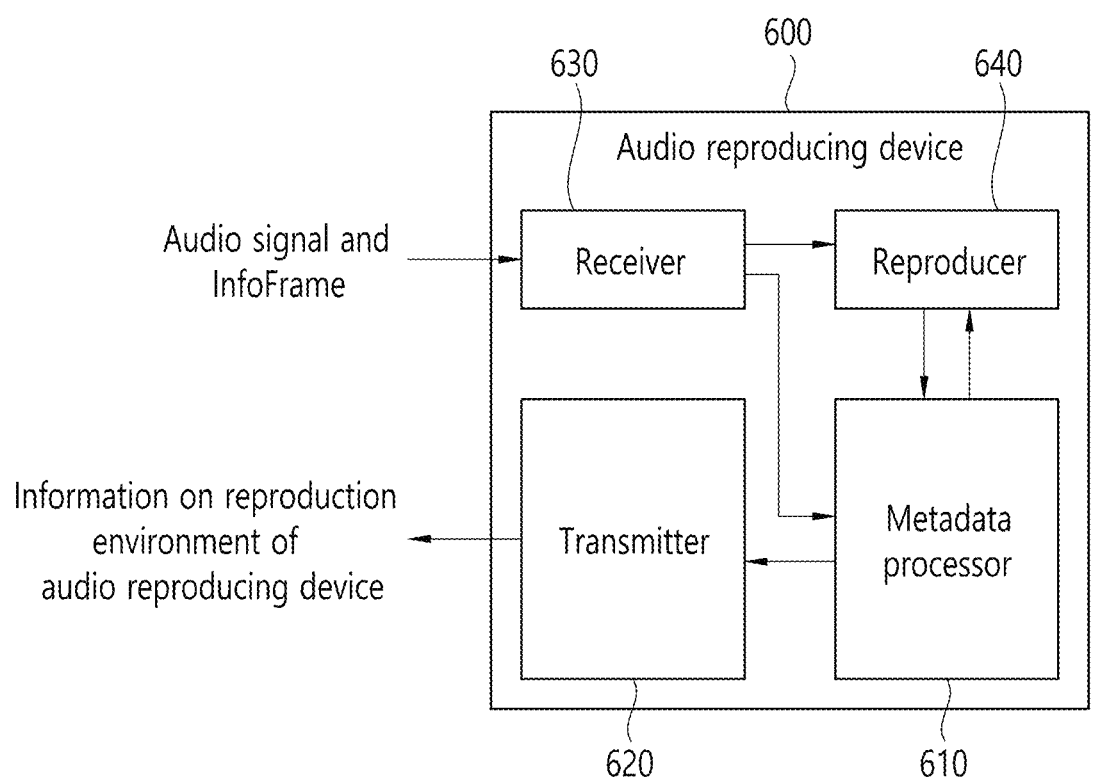
FIG. 6 is a block diagram showing a configuration of an audio reproducing device according to an embodiment of the present disclosure.

FIG. 6 is a block diagram showing a configuration of an audio reproducing device according to an embodiment of the present disclosure.

In this specification, an "audio reproducing device (600)" may mean a device reproducing audio signals, such as, for example, a speaker, headphones, earphones, HMD, and so on. However, the present disclosure will not be limited only to this. The audio reproducing device (600) may reproduce audio signals received from the audio processing device (500), which transmits and receives audio data to and from the audio reproducing device (600). However, the method of performing audio reproduction by the audio reproducing device (600) will not be limited only to this.

The audio data transmission and reception between the audio processing device (500) and the audio reproducing device (600) may also occur in a multi-user environment. A multi-user environment may refer to an environment where at least one audio reproducing device communicating with the audio processing device (500) and the audio reproducing device (600) exists so that multiple users can be capable of listening to audio content, which is reproduced based on audio signals being received from the audio processing device (500), through multiple reproducing devices. In a multi-user environment, the audio reproducing device (600) may correspond to a master device or may correspond to a sub-device, among multiple audio reproducing devices. In a multi-user environment, communication using, for example, Wi-Fi or Bluetooth may be performed between multiple audio reproducing devices, or between multiple audio reproducing devices and the audio processing device (500). However, the communication method will not be limited only to this. Detailed description on the multi-user environment and operations of the audio processing device (500) and the audio reproducing device (600) according to the multi-user environment will be provided in more detail later on in FIG. 12.

As shown in FIG. 6, the audio reproducing device (600) according to this embodiment may include a metadata processor (610), a transmitter (620), a receiver (630), and a reproducer (640). However, not all of the configuration elements shown in FIG. 6 are the essential configuration elements of the audio reproducing device (600). The audio reproducing device (600) may also be embodied by a larger number or a smaller number of configuration elements as compared to the configuration elements shown in FIG. 6.

In the audio reproducing device (600) according to this embodiment, each of the metadata processor (610), the transmitter (620), the receiver (630), and the reproducer (640) may be embodied as a separate chip, or at least two or more configuration elements may be embodied through one chip.

The metadata processor (610) according to this embodiment may collect information on the reproduction environment of the audio reproducing device (600). More specifically, the metadata processor (610) may collect the information on the reproduction environment of the audio reproducing device (600) that is stored in a memory (or storage unit) (not shown in FIG. 6) of the audio reproducing device (600).

The transmitter (620) according to this embodiment may transmit the information on the reproduction environment of the audio reproducing device (600), which is transferred from the metadata processor (610), to the audio processing device (500).

As described above in FIG. 5, the audio processing device (500) according to this embodiment may generate an audio signal by processing an audio bitstream based on the information on the reproduction environment of the audio reproducing device (600) and may generate an InfoFrame based on characteristic information of the generated audio signal. The receiver (630) according to this embodiment may receive an audio signal and an InfoFrame from the audio processing device (500). The receiver (630) may transfer the received audio signal to the reproducer (640) and may transfer the received InfoFrame to the metadata processor (610). However, the present disclosure will not be limited only to this method. For example, the receiver (630) may also transfer both the received audio signal and the received InfoFrame to the reproducer (640).

The audio signal that is received by the receiver (630) of the audio reproducing device (600) according to this embodiment, from the audio processing device (500), may be a compressed signal or may be a non-compressed signal. In case the received audio signal is an uncompressed signal, the receiver (630) may transfer the received audio signal directly to at least one of the metadata processor (610) and the reproducer (640). In case the received audio signal is a compressed signal, after decoding the received audio signal, the receiver (630) may transfer the decoded signal to at least one of the metadata processor (610) and the reproducer (640). At this point, the decoding of the compressed signal may be performed by the receiver (630) or may be performed by a separate decoder.

The reproducer (640) according to this embodiment may reproduce the received audio signal based on the InfoFrame. More specifically, the InfoFrame may be read by the metadata processor (610), and information obtained by reading the InfoFrame may be transferred to the reproducer (640) from the metadata processor (610). And, based on the information that is obtained by reading the InfoFrame, the reproducer (640) may reproduce the received audio signal. However, the method for reproducing the audio signal by the reproducer (640) will not be limited only to this. For example, after directly receiving the audio signal and the InfoFrame from the receiver (630), the reproducer (640) may reproduce the audio signal based on the InfoFrame.

Additionally, the reproducer (640) according to this embodiment may transfer information that is obtained while reproducing the audio signal, which is received from the audio processing device (500), to the metadata processor (610).

Although it is not shown in FIG. 6, the reproducer (640) according to this embodiment may also include at least one of a reproduction controller, a Digital analog (D/A) converter, an Amplifier (AMP), and a Transducer.

The reproduction controller according to this embodiment may control the reproduction of the audio signal while transmitting and receiving data to and from the metadata processor (610). For example, the reproduction controller may receive the InfoFrame from the metadata processor (610) and may then control the reproduction of the audio signal based on the received InfoFrame. The reproduction controller may distribute the audio signal in accordance with a number of channels.

The D/A converter according to this embodiment may perform digital-to-analog conversion on the audio signal received from the reproduction controller. And, the AMP according to this embodiment may amplify the audio signal that is processed with digital-to-analog conversion by the D/A converter, and the amplified audio signal may be transferred to the transducer according to this embodiment. The number of D/A converters, AMPs, and transducers may be determined according to the reproduction environment. For example, in case the audio reproducing device (600) is a pair of stereo speakers or headphones, left-side and right-side, i.e., 2, D/A converters, AMPs, and transducers may exist. Additionally, in case of a multi-user environment where multiple audio reproducing devices exist, the number of D/A converters, AMPs, and transducers may further increase.

According to the audio reproducing device (600) that is described in FIG. 6, the information on the reproduction environment including information on 3D audio reproduction of the audio reproducing device (600) may be transmitted to the audio processing device (500), and the 3D audio signal generated by the audio processing device (500) based on the information on the reproduction environment and the generated InfoFrame may be received from the audio processing device (500). More specifically, while transmitting and receiving 3D audio data to and from the audio processing device (500), the audio reproducing device (600) may more smoothly reproduce the 3D audio content in accordance with the 3D audio reproduction environment of the audio reproducing device (600).

Figure 7:
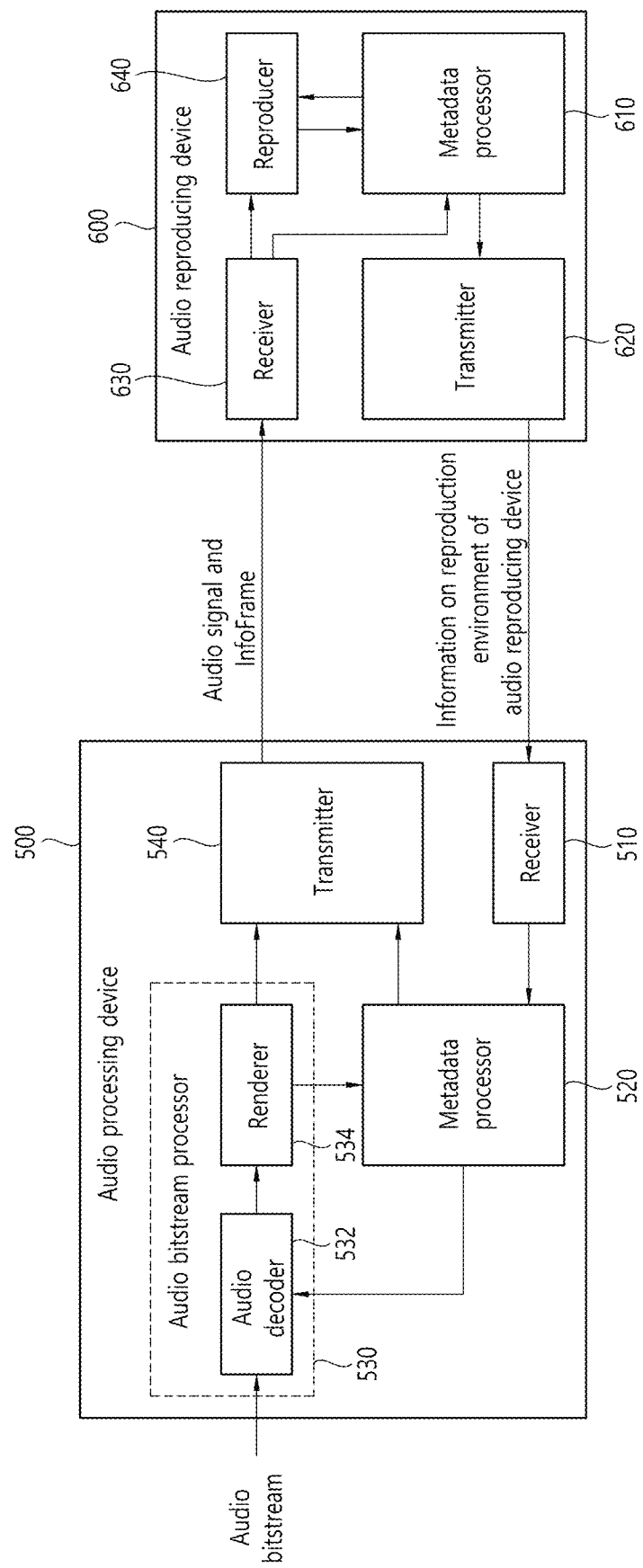
FIG. 7 is a block diagram showing a configuration of an audio processing device and an audio reproducing device according to an embodiment of the present disclosure.

FIG. 7 is a block diagram showing a configuration of an audio processing device and an audio reproducing device according to an embodiment of the present disclosure.

As shown in FIG. 7, the audio processing device (500) according to this embodiment may include a receiver (510), a metadata processor (520), an audio bitstream processor (530), and a transmitter (540). And, the audio reproducing device (600) according to this embodiment may include a metadata processor (610), a transmitter (620), a receiver (630), and a reproducer (640).

It shall be easily understood by anyone skilled in the art that the audio processing device (500) and the audio reproducing device (600) shown in FIG. 7 may operate identically as the audio processing device (500) shown in FIG. 5 and the audio reproducing device (600) shown in FIG. 6, respectively. Therefore, hereinafter, detailed description on the receiver (510), the metadata processor (520), the audio bitstream processor (530), and the transmitter (540) of the audio processing device (500) and detailed description on the metadata processor (610), the transmitter (620), the receiver (630), and the reproducer (640) of the audio reproducing device (600) that are identical or similar to the description provided in FIG. 5 and FIG. 6 shall be omitted or briefly described.

The audio processing device (500) and the audio reproducing device (600) according to this embodiment may be interconnected via a wired interface. For example, the audio processing device (500) and the audio reproducing device (600) may be interconnected via High-Definition Multimedia Interface (HDMI).

As one of the transmission/reception standards (or specifications) of HDMI, there is CTA-861-G. The audio processing device (500) and the audio reproducing device (600) according to this embodiment may transmit and receive audio data to and from one another based on the CTA-861-G standard of HDMI. And, most particularly, the audio processing device (500) and the audio reproducing device (600) according to this embodiment may transmit and receive 3D audio data for realizing VR or AR content to and from one another. The 3D audio data may be included in the information on the reproduction environment of the audio reproducing device (600) and then transferred to the audio processing device (500) from the audio reproducing device (600), or the 3D audio data may be included in the InfoFrame and then transferred to the audio reproducing device (600) from the audio processing device (500). For example, the 3D audio data may be included in an extended data block of a CTA EDID extension, which is defined by extending EDID defined in Video Electronics Standards Association (VESA), and may then be transferred to the audio processing device (500) from the audio reproducing device (600).

By transmitting and receiving 3D audio data to and from one another, the audio processing device (500) and the audio reproducing device (600) according to this embodiment may smoothly provide VR audio or AR audio to a user under a VR system or AR system.

The metadata processor (610) of the audio reproducing device (600) according to this embodiment may collect information on the reproduction environment of the audio reproducing device (600).

The transmitter (620) of the audio reproducing device (600) according to this embodiment may transmit the information on the reproduction environment of the audio reproducing device (600) to the audio processing device (500).

The receiver (510) of the audio processing device (500) according to this embodiment may receive the information on the reproduction environment of the audio reproducing device (600) from the audio reproducing device (600). For example, the receiver (510) of the audio processing device (500) may receive the information on the reproduction environment of the audio reproducing device (600) from the audio reproducing device (600) through a Display Data Channel (DDC).

The metadata processor (520) of the audio processing device (500) according to this embodiment may receive the information on the reproduction environment of the audio reproducing device (600) from the receiver (510) and may read the received information on the reproduction environment of the audio reproducing device (600). The metadata processor (520) may transfer the information on the reproduction environment of the audio reproducing device (600) to the audio bitstream processor (530), so that the audio bitstream processor (530) can use the information on the reproduction environment of the audio reproducing device (600) during the process of processing the audio bitstream so as to generate an audio signal. Additionally, the metadata processor (520) may generate an InfoFrame based on the audio signal that is generated by processing the audio bitstream by the audio bitstream processor (530).

The audio bitstream processor (530) of the audio processing device (500) according to this embodiment may generate an audio signal by processing an audio bitstream based on the information on the reproduction environment of the audio reproducing device (600). More specifically, an audio bitstream may include a VR audio bitstream or an AR audio bitstream, and the audio bitstream processor (530) may generate a 3D audio signal by processing at least one of a VR audio bitstream and an AR audio bitstream based on the information on the reproduction environment of the audio reproducing device (600).

In case a 3D audio signal is generated by processing a 3D audio bitstream (e.g., binaural rendering, 3D audio effect, and so on) in the audio processing device (500), in order to smoothly reproduce the 3D audio signal, the audio reproducing device (600) may need to refer to the information provided from the audio processing device (500). At this point, the information provided from the audio processing device (500) may, for example, be the InfoFrame.

The transmitter (540) of the audio processing device (500) according to this embodiment may transmit the audio signal generated in the audio bitstream processor (530) and the InfoFrame generated from the metadata processor (520) to the audio reproducing device (600).

The receiver (630) of the audio reproducing device (600) according to this embodiment may receive an audio signal and an InfoFrame from the audio processing device (500). The receiver (630) may transfer the received audio signal to the reproducer (640) and may transfer the received InfoFrame to the metadata processor (610).

The reproducer (640) according to this embodiment may reproduce the received audio signal based on the InfoFrame. More specifically, the InfoFrame may be read by the metadata processor (610), and the information that is obtained by reading the InfoFrame may be transferred to the reproducer (640) from the metadata processor (610). Thereafter, the reproducer (640) may reproduce the received audio signal based on the information obtained by reading the InfoFrame.

Although it is not shown in FIG. 7, the audio processing device (500) according to this embodiment may include an audio option controller, and the audio reproducing device (600) according to this embodiment may include a user option controller.

The user option controller according to this embodiment may obtain configuration information related to the audio reproduction environment from a user using the audio reproducing device (600). In other words, the user may change the audio reproduction environment through the user option controller. For example, in order to avoid being influenced by another user or another audio reproducing device in a multi-user environment, the user may set-up a configuration for blocking audio data from another user or another audio reproducing device through the user option controller.

The user option controller may transfer configuration information related to the audio reproduction environment that is obtained from the user to the transmitter (620) of the audio reproducing device (600), and the transmitter (620) may transmit the configuration information related to the audio reproduction environment to the audio processing device (500). The receiver (510) of the audio processing device (500) may receive the configuration information related to the audio reproduction environment and may transfer the received information to the audio option controller. The audio option controller according to this embodiment may transfer the configuration information related to the audio reproduction environment to the metadata processor (520) or the audio bitstream processor (530).

The metadata processor (520) according to this embodiment may process or correct an EDID or InfoFrame based on the configuration information related to the audio reproduction environment. Additionally, the audio bitstream processor (530) according to this embodiment may generate an audio signal by processing an audio bitstream based on the configuration information related to the audio reproduction environment.

Additionally, although it is not shown in FIG. 7, the audio bitstream processor (530) of the audio processing device (500) according to this embodiment may further include a multi-user audio decoder. The multi-user audio decoder according to this embodiment may decode a multi-user audio bitstream that is received through a network or broadcasting network in a multi-user environment. At this point, the multi-user audio decoder may decode the multi-user audio bitstream based on the configuration information related to the audio reproduction environment of the audio reproducing device (600) that is obtained through the metadata processor (520). The multi-user audio decoder may be a separate decoder other than the audio decoder (532). However, in some cases, an integrated decoder may perform the operations of both the audio decoder (532) and the multi-user audio decoder.

In this embodiment, the audio signal that is decoded by the multi-user audio decoder may be synthesized with the audio signal that is decoded by the audio decoder (532), and the synthesized audio signal may be rendered by the renderer (534).

Figure 8A:
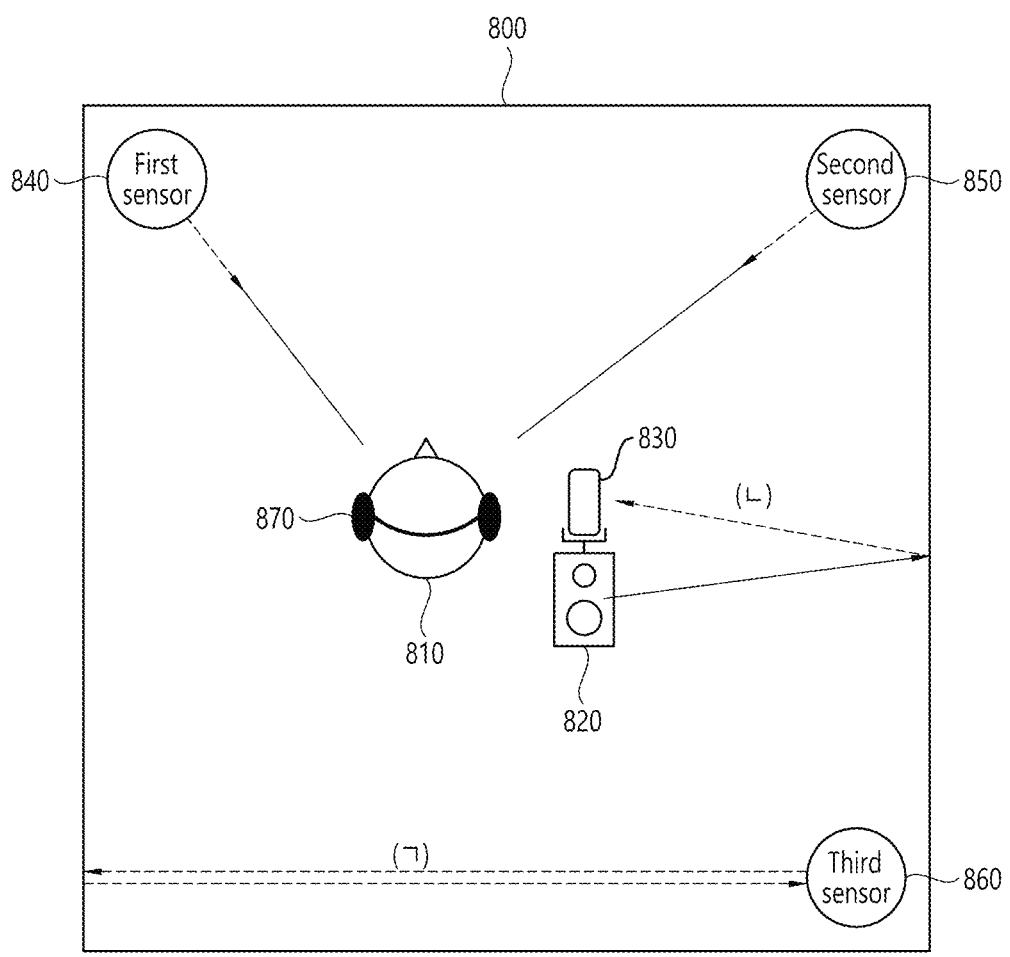

FIG. 8a and FIG. 8b show examples of obtaining information on a reproduction environment of an audio reproducing device according to an embodiment of the present disclosure.

The information on the reproduction environment of the audio reproducing device (600) according to this embodiment may include room information and characteristic information on the user's ear. Hereinafter, an example of obtaining the room information by the audio reproducing device (600) will be described in detail with reference to FIG. 8*a*, and an example of obtaining the characteristic information on the user's ear by the audio reproducing device (600) will be described in detail with reference to FIG. 8*b*.

FIG. 8*a* is an example of obtaining room information by the audio reproducing device (600) according to this embodiment.

A Binaural Room Impulse Response (BRIR) may be pre-stored in the audio processing device (500) according to part of this embodiment, and, in case an audio reproduction request occurs from an external source, the audio processing device (500) may process a 3D audio signal (or 3D audio bitstream) based on the pre-stored BRIR. However, the BRIR is not pre-stored in all audio processing devices (500). And, considering that modeling a BRIR based on room information of a room (800) in which the audio reproducing device (600) is located is a method for more efficiently providing audio content to a user (810), in some cases, there is a need to process a 3D audio signal (or 3D audio bitstream) based on the room information of the room (800) in which the audio reproducing device (600) is located. The audio reproducing device (600) according to this embodiment may obtain room information of the room (800) in which the audio reproducing device (600) is located and may transmit (or signal) the obtained room information to the audio processing device (500).

In this embodiment, the information on the reproduction environment of the audio reproducing device (600) may include an EDID, the EDID may include a CTA data block, and the CTA data block may include an extended tag code indicating a VR-AR audio data block. The VR-AR audio data block may include a 3D availability flag indicating whether or not the audio reproducing device (600) is capable of reproducing a 3D audio signal. And, in case the 3D availability flag indicates 1, the VR-AR audio data block may include at least one of 3D audio signal type information, a flag indicating whether or not characteristic information of the user's ear is used, and a flag indicating whether or not room information is used. The room information will be described in detail in FIG. 8*a*, and more detailed description on a CTA data block, a VR-AR audio data block, an extended tag code, a 3D availability flag, and 3D audio signal type information will be provided later on with reference to FIG. 9.

In case the flag indicating whether or not room information is used indicates 1, the VR-AR audio data block may include room information, and the room information being included in the VR-AR audio data block may be transferred to the audio processing device (500) from the audio reproducing device (600). In other words, the room information may be signaled from the audio reproducing device (600) to the audio processing device (500).

In this embodiment, the room information may include at least one of information on a size of the room (800) in which the audio reproducing device (600) is located, information on a reflection coefficient of a substance (or material) configuring the room (800) in which the audio reproducing device (600) is located, information on a location of the user (810) within the room (800) in which the audio reproducing device (600) is located, and information on a gazing direction of the user (810). The room information may be used for a purpose of room response correction.

Referring to FIG. 8*a*, headphones (870) worn by the user (810) or speakers (820) including a microphone (830) may be the audio reproducing device (600), and an area (or zone) of a predetermined range based on the audio reproducing device (600) may be interpreted as the room (800) in which the audio reproducing device (600) is located. A first sensor (840), a second sensor (850), and a third sensor (860) may exist in the room (800) in which the audio reproducing device (600) is located.

In this embodiment, the room information (or room environment) may be obtained by the user (810). For example, the user (810) may manually input at least one of the information on a size of the room (800) in which the audio reproducing device (600) is located, the information on a reflection coefficient of a substance (or material) configuring the room (800) in which the audio reproducing device (600) is located, the information on a location of the user (810) within the room (800) in which the audio reproducing device (600) is located, and the information on a gazing direction of the user (810) to the audio reproducing device (600). The audio reproducing device (600) may obtain room information of the room (800) in which the audio reproducing device (600) is located from the user (810) through a user interface (UI).

Alternatively, the room information shown in FIG. 8*a* may be estimated by the audio reproducing device (600) itself or based on information received from at least one sensor communicating with the audio reproducing device (600).

In an example, as shown in (¬) of FIG. 8*a*, the third sensor (860) according to this embodiment may emit infrared rays, and the third sensor (860) may measure a time during which the infrared light rays emitted from the third sensor (860) reach a predetermined point within the room (800) in which the audio reproducing device (600) is located and, then, are reflected and detected by the third sensor (860). Thus, the third sensor (860) may estimate the size of the room (800) in which the audio reproducing device (600) is located.

In another example, as shown in (ㄴ) of FIG. 8*a*, the speakers (820) according to this embodiment may obtain room information of the room (800) in which the speakers (820) are located based on a response signal being received (as sound) through a microphone (830). More specifically, the speakers (820) according to this embodiment may emit predetermined signals, and, in case the predetermined signals being emitted from the speakers (820) reach a predetermined point within the room (800) in which the speakers (820) are located and, then, are reflected and detected by the speakers (820), the speakers may estimate the reflection coefficient of a substance (or material) configuring the room (800) in which the speakers (820) are located by comparing an amplitude of the predetermined signals being emitted from the speakers (820) and an amplitude of the predetermined signals being reflected and detected by the speakers (820).

If the amplitude of the predetermined signals being reflected and detected by the speakers (820) is smaller than a value applying a predetermined threshold value to the amplitude of the predetermined signals being emitted from the speakers (820), the speakers (820) may determine that the reflection coefficient of the room (800) in which the speakers (820) are located is small. Conversely, if the amplitude of the predetermined signals being reflected and detected by the speakers (820) is greater than a value applying a predetermined threshold value to the amplitude of the predetermined signals being emitted from the speakers (820), the speakers (820) may determine that the reflection coefficient of the room (800) in which the speakers (820) are located is large.

In another example, the audio reproducing device (600) may estimate a location of the user (810) within the room (800) in which the audio reproducing device (600) is located. More specifically, the audio reproducing device (600) may emit predetermined signals, and the predetermined signals being emitted from the audio reproducing device (600) may be reflected from part of a wall surface of the room (800) in which the audio reproducing device (600) is located and may then be received (as sound) by a microphone worn by the user (810). The microphone worn by the user (810) may estimate the location of the user (810) within the room (800) in which the audio reproducing device (600) is located based on a type of predetermined signals, an angle at which the predetermined signals are emitted, a time consumed starting from a time point where the predetermined signals are emitted from the audio reproducing device (600) to a time point where the predetermined signals are received (as sound) through the microphone.

In another example, the audio reproducing device (600) may estimate a gazing direction of the user (810) based on at least one sensor.

FIG. 8b is an example of obtaining characteristic information of the user's ear by the audio reproducing device (600) according to this embodiment.

In order to provide 3D audio content to a user, the audio processing device (500) may apply a Head-Related Impulse Response (HRIR) or Head-Related Transfer Function (HRTF) characterizing the shape of the user's ear to the 3D audio signal. A HRIR (or HRTF) may be pre-stored in the audio processing device (500) according to part of this embodiment, and, in case an audio reproduction request occurs from an external source, the audio processing device (500) may process a 3D audio signal (or 3D audio bitstream) based on the pre-stored HRIR (or HRTF). However, the HRIR (or HRTF) that is pre-stored in the audio processing device (500) is obtained through a dummy head, and since it is difficult for the HRIR (or HRTF) obtained from the dummy head to reflect the characteristics of the ear of all users, obtaining (or modeling) the HRIR (or HRTF) based on the characteristic information on the ear of each individual user may be a more efficient method for providing audio content to users. The audio reproducing device (600) according to the embodiment of the present disclosure may obtain characteristic information of the user's ear and transmit (or signal) the obtained characteristic information to the audio processing device (500).

According to this embodiment, the information on the reproduction environment of the audio reproducing device (600) may include an EDID, the EDID may include a CTA data block, and the CTA data block may include an extended tag code indicating a VR-AR audio data block. The VR-AR audio data block may include a 3D availability flag indicating whether or not the audio reproducing device (600) is capable of reproducing a 3D audio signal. And, in case the 3D availability flag indicates 1, the VR-AR audio data block may include a flag indicating whether or not characteristic information of the user's ear is used.

In case the flag indicating whether or not characteristic information of the user's ear is used indicates 1, the extended data block may include a Personal (or User) Head Information Data Block. The Personal Head Information Data Block may include information on a head width of the user and information on lengths or angles of characteristic parts of the user's ear.

The information on a head width and the information on lengths or angles of characteristic parts of the user's ear may be obtained based on at least one sensor being connected to the audio reproducing device (600) via wired/wireless connection. The at least one sensor may be embedded in the audio reproducing device (600) or may be detached from the audio reproducing device (600) and may perform wireless communication with the audio reproducing device (600) as a separate device. However, exemplary relationships between the at least one sensor and the audio reproducing device (600) will not be limited only to this.

The audio reproducing device (600) may obtain information on a head width of the user and may transmit (or signal) the obtained information to the audio processing device (500). For example, in case the audio reproducing device (600) is a set of headphones, at least one sensor embedded in the headphones may measure or predict the head width of the user. The headphones may transmit (or signal) the information on the head width of the user, which is obtained through the at least one sensor, to the audio processing device (500) through the Personal Head Information Data Block.

Additionally, the audio reproducing device (600) may obtain information on the lengths or angles of characteristic parts of the user's ear and may transmit (or signal) the obtained information to the audio processing device (500). Referring to FIG. 8b, an example of sorting the lengths or angles of characteristic parts of the user's ear is shown. For example, in case the audio reproducing device (600) is a set of headphones, at least one sensor embedded in the headphones may measure or predict the lengths or angles of characteristic parts of the user's ear. The headphones may transmit (or signal) the information on the lengths or angles of characteristic parts of the user's ear, which are obtained through the at least one sensor, to the audio processing device (500) through the Personal Head Information Data Block.

Referring to FIG. 8b, the information on the lengths of characteristic parts of the user's ear according to this embodiment may be categorized from $d_1$ to $d_8$, and the information on the angles of characteristic parts of the user's ear according to this embodiment may be categorized as $\theta_1$ and $\theta_2$. Herein, $d_1$ to $d_8$ may respectively correspond to PINN1 to PINN8 being transmitted to the audio processing device (500) from the audio reproducing device (600) through the Personal Head Information Data Block. And, $\theta_1$ and $\theta_2$ may respectively correspond to PINN9 and PINN10 being transmitted to the audio processing device (500) from the audio reproducing device (600) through the Personal Head Information Data Block. However, the embodiments of categorizing the information on the lengths of characteristic parts of the user's ear will not be limited only to this. The transmission (or signaling) of the Personal Head Information Data Block from the audio reproducing device (600) to the audio processing device (500) will be described in more detail later on with reference to FIG. 9.

Figure 9:
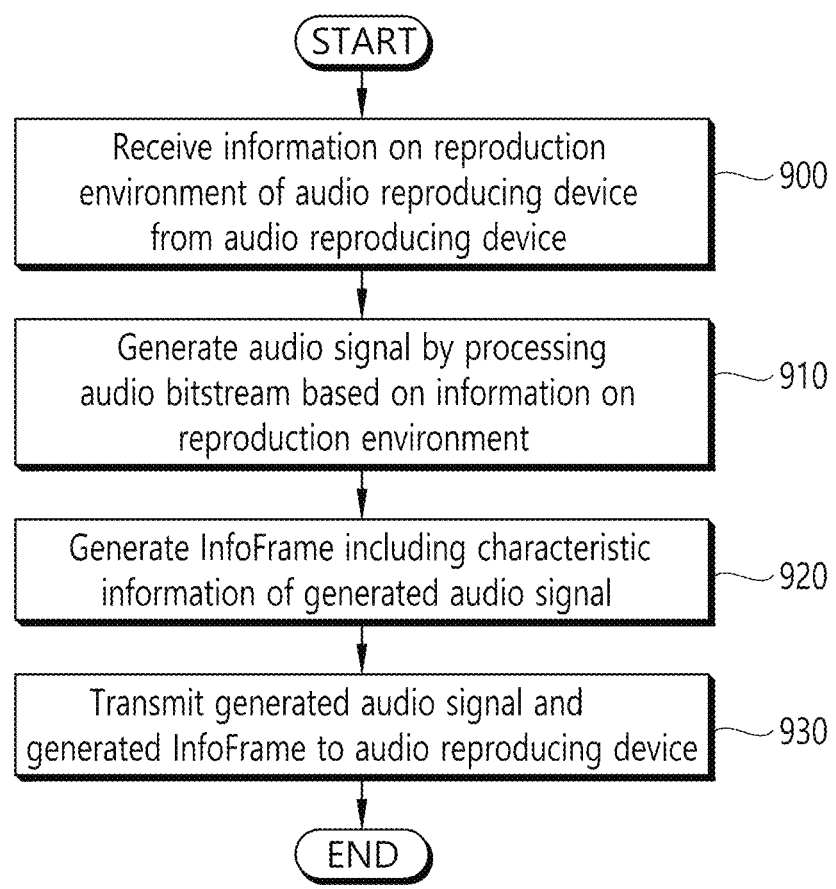
FIG. 9 is a flow chart showing a process of processing audio data by an audio processing device according to an embodiment of the present disclosure.

FIG. 9 is a flow chart showing a process of processing audio data by an audio processing device according to an embodiment of the present disclosure.

Each process step disclosed in FIG. 9 may be performed by the audio processing device (500) shown in FIG. 5. More specifically, for example, step 900 of FIG. 9 may be performed by the receiver (510) of the audio processing device (500), step 910 may be performed by the metadata processor (520) and the audio bitstream processor (530) of the audio processing device (500), step 920 may be performed by the metadata processor (520) of the audio processing device (500), and step 930 may be performed by the transmitter (540) of the audio processing device (500). Therefore, when describing each process step of FIG. 9, detailed description that are identical or similar to the description provided in FIG. 5 shall be omitted or briefly described.

This specification uses terms or sentences for defining specific information or concepts. For example, this specification defines information indicating whether or not a 3D audio signal can be reproduced by the audio reproducing device (600) as a "3-Dimensional availability flag", and an example of a 3D availability flag is proposed as "3DA", which is included in the EDID. However, the term "3-Dimensional availability flag" may also be replaced with other various terms, such as 3-dimensional availability information, 3D availability information, 3D availability flag, and so on, and the term "3DA" may also be replaced with other various terms, such as "3DAI", "3DAFlag", and so on. And, therefore, in this specification, terms or sentences (or phrases) used throughout the entire specification for defining specific information or concepts shall not be interpreted only according to the terminology itself but shall be interpreted and understood based on their various operations, functions, and effects.

In step 900, the audio processing device (500) may receive the information on the reproduction environment of the audio reproducing device (600) from the audio reproducing device (600).

In this embodiment, the information on the reproduction environment of the audio reproducing device (600) may include an EDID, and, in some cases, the information on the reproduction environment may mean the EDID. The EDID may include a CTA data block for indicating at least one of status information and reproduction capability information of the audio reproducing device (600), and an example of the CTA data block is as shown below in Table 1.

TABLE 1

| Codes | Type of Data Block |
|---|---|
| 0 | Reserved |
| 1 | Audio Data Block (includes one or more Short Audio Descriptors) |
| 2 | Video Data Block (includes one or more Short Audio Descriptors) |
| 3 | Vendor-Specific Data Block |
| 4 | Speaker Allocation Data Block |
| 5 | VESA Display Transfer Characteristics Data Block |
| 6 | VR Data Block |
| 7 | Use Extended Tag |

The CTA data block includes tag codes from 0 to 7, and each tag code may be expressed as a binary code. The tag codes of the CTA data block are for categorizing the information being included in the CTA data block according the information (or block) type. Most particularly, in case the tag code of the CTA data block is signaled as $7(111)_2$, extended tag codes may be used, and an example of the extended tag codes is as shown below in Table 2.

TABLE 2

| Extended Tag Codes | Type of Data Block |
|---|---|
| 0 | Video Capability Data Block |
| 1 | Vendor-Specific Video Data Block |
| 2 | VESA Display Device Data Block [100] |
| 3 | VESA Video Timing Block Extension |
| 4 | Reserved for HDMI Video Data Block |
| 5 | Colorimetry Data Block |
| 6 | HDR Static Metadata Data Block |
| 7 | HDR Dynamic Metadata Data Block |
| 8 ... 12 | Reserved for video-related blocks |
| 13 | Video Format Preference Data Block |
| 14 | $YC_BC_R$ 4:2:0 Video Data Block |
| 15 | $YC_BC_R$ 4:2:0 Capability Map Data Block |
| 16 | Reserved for CTA Miscellaneous Audio Fields |
| 17 | Vendor-Specific Audio Data Block |
| 18 | Reserved for HDMI Audio Data Block |
| 19 | Room Configuration Data Block |
| 20 | Speaker Location Data Block |
| 21 | VR/AR Audio Data Block |
| 22 | Personal Head Information Data Block |
| 23 ... 31 | Reserved for audio-related blocks |
| 32 | InfoFrame Data Block (includes one or more Short InfoFrame Descriptors) |

A total of 256 extended tag codes from 0 to 255 may exist, and each extended tag code may be expressed as a hexadecimal code. Each of the extended tag codes is for categorizing the extended data blocks included in the CTA data block according the block type. As shown in Table 2, the information on the reproduction environment of the audio reproducing device (600) according to the embodiment of the present disclosure may include a "VR-AR Audio data block" in an extended data block corresponding to extended tag code number 21 of the EDID and may include a "Personal Head Information Data Block" in an extended data block corresponding to extended tag code number 22 of the EDID. The audio reproducing device (600) may transfer information on a 3D audio reproduction environment of the audio reproducing device (600) to the audio processing device (500) through at least one of the extended data block according to extended tag code number 21 and the extended data block according to extended tag code number 22. And, as a result, the audio reproducing device (600) may smoothly reproduce 3D audio, i.e., VR audio or AR audio based on the audio signal generated in the audio processing device (500).

An example of a VR-AR audio data block corresponding to extended tag code number 21 of Table 2 is as shown below in Table 3.

TABLE 3

| Byte# | bits | | | | | | | |
|---|---|---|---|---|---|---|---|---|
| | 7 | 6 | 5 | 4 | 3 | 2 | 1 | 0 |
| 1 | Tag Code (0x07) | | | Length of following block payload (bytes) | | | | |
| 2 | Extended Tag Code (0x15) | | | | | | | |
| 3 | F37 = 0 | F36 = 0 | F35 = 0 | 3DA | DI1 | DI0 | EID | PHD |

TABLE 3-continued

| Byte# | 7 | 6 | 5 | 4 | 3 | 2 | 1 | 0 |
|---|---|---|---|---|---|---|---|---|
| | | | | | | bits | | |
| 4 | F47 = 0 | F46 = 0 | F45 = 0 | Treadmill | ARMIC | StereoMIC | Direct | MD |
| 5 | F57 = 0 | MU | Master | | | User Count | | |
| MUMAX1 | | | | | MU_Xmax | | | |
| MUMAX2 | | | | | MU_Ymax | | | |
| MUMAX3 | | | | | MU_Zmax | | | |
| 9 through 23 | | | | Room environment description | | | | |
| AZIM1 | | | | | Azimuth of mic1 | | | |
| ELEV1 | | | | | Elevation of mic1 | | | |
| AZIM2 | | | | | Azimuth of mic2 | | | |
| ELEV2 | | | | | Elevation of mic2 | | | |

In Table 3, upper 3 bits of a first byte denote a tag code of a CTA data block, and lower 5 bits of the first byte denote a length of the corresponding CTA data block, and a second byte may denote an extended tag code of an extended data block. Since Table 3 shows an example of a VR-AR audio data block, the upper 3 bits of the first byte indicates tag code index $7(111)_2$, and the second byte indicates extended tag code index 21(0x15).

A 3D availability flag may indicate whether or not the audio reproducing device (600) can reproduce a 3D audio signal, and a 3DA included in an upper fourth bit of a third byte of the VR-AR audio data block may correspond to an example of the 3D availability flag. When reproducing 3D audio content including VR content and AR content through a set of headphones, which is one of the audio reproducing devices (600), the audio signal is reproduced as a 3D audio signal, and since a head tracking function is also supported, a location of a sound source, which is defined within the room (or space), may always be the same regardless of a turning of the head of the user. Therefore, when 3DA indicates 1, this may indicate that the audio reproducing device (600) may reproduce a 3D audio signal supporting head tracking. And, when 3DA indicates 0, since head tracking is not supported, this may indicate that the audio reproducing device (600) cannot reproduce the 3D audio signal.

In case 3DA included in the VR-AR audio data block according to the embodiment indicates 1, a third byte of the VR-AR audio data block may additionally include DI1, DI0, Environment Information Description (EID), and Personal Head Description (PHD).

3D audio signal type information may indicate a Degree of Freedom (DoF) according to which a 3D audio signal is processed. And, DI1 being included in an upper fifth bit and DI0 being included in an upper sixth bit of the third byte in the VR-AR audio data block may correspond to an example of the 3D audio signal type information. An example of the 3D audio signal type information is as shown below in Table 4.

TABLE 4

| DI1 | DI0 | Degree of Freedom |
|---|---|---|
| 0 | 0 | 3DoF |
| 0 | 1 | 3DoF+ |

TABLE 4-continued

| DI1 | DI0 | Degree of Freedom |
|---|---|---|
| 1 | 0 | 6DoF |
| 1 | 1 | 6DoF_AR |

In Table 4, in case both DI1 and DI0 indicate 0, i.e., in case a bit value of the 3D audio signal type information indicates "00", the audio processing device (500) having received the information on the reproduction environment from the audio reproducing device (600) may process a VR audio bitstream based on 3DoF. Similarly, in case DI1 indicates 0 and DI0 indicates 1 (i.e., in case the bit value of the 3D audio signal type information indicates "01"), the audio processing device (500) may process the VR audio bitstream based on a DoF that is higher than 3DoF. And, in case DI1 indicates 1 and DI0 indicates 0 (i.e., in case the bit value of the 3D audio signal type information indicates "10"), the audio processing device (500) may process the VR audio bitstream based on 6DoF. In other words, in case the bit value of the 3D audio signal type information is equal to "00", "01", and "10", this indicates the DoF when processing the VR audio bitstream.

In Table 4, in case both DI1 and DI0 indicate 1, i.e., in case the bit value of the 3D audio signal type information indicates "11", the audio processing device (500) may process an AR audio bitstream based on 6DoF.

In Table 3, an EID included in a lower second bit of the third byte of the VR-AR audio data block may correspond to an example of a flag indicating whether or not room information (or room environment) is being used, and a PHD included in a lower first bit of the third byte of the VR-AR audio data block may correspond to an example of a flag indicating whether or not characteristic information of the user's ear is being used.

In case the flag indicating whether or not characteristic information of the user's ear is being used, e.g., the PHD of Table 3 indicates 1, an extended data block may include a personal head information data block. As described above in FIG. 8b, the personal head information data block may include information on a head width of the user and information on lengths or angles of characteristic parts of the user's ear, and an example of the personal head information data block is as shown below in Table 5.

TABLE 5

| Byte# | 7 | 6 | 5 | 4 | 3 | 2 | 1 | 0 |
|---|---|---|---|---|---|---|---|---|
| 1 | Tag Code (0x07) | | | Length of following block payload (bytes) | | | | |
| 2 | Extended Tag Code (0x16) | | | | | | | |
| DMAX | Max distance of anthropometric measurement | | | | | | | |
| DIDX | F47 = 0 | F46 = 0 | F45 = 0 | F44 = 0 | Measurement index (0 to 10) | | | |
| HEAD | Head width | | | | | | | |
| PINN1 | Cavum concha height | | | | | | | |
| PINN2 | Cymba concha height | | | | | | | |
| PINN3 | Cavum concha width | | | | | | | |
| PINN4 | Fossa height | | | | | | | |
| PINN5 | Pinna height | | | | | | | |
| PINN6 | Pinna width | | | | | | | |
| PINN7 | Intertragal incisures width | | | | | | | |
| PINN8 | Cavum concha | | | | | | | |
| PINN9 | Pinna rotation angle | | | | | | | |
| PINN10 | Pinna flare angle | | | | | | | |

As described above in Table 3, in the example of the personal head information data block shown in Table 5, upper 3 bits of a first byte denote a tag code of a CTA data block, and lower 5 bits of the first byte denote a length of the corresponding CTA data block, and a second byte may denote an extended tag code of an extended data block. Since Table 5 shows an example of the personal head information data block, the upper 3 bits of the first byte indicates tag code index $7(111)_2$, and the second byte indicates extended tag code index 22(0x16).

The information on the head width of the user, $d_1$ to $d_8$ being the information on the lengths of characteristic parts of the user's ear, and $\theta_1$ and $\theta_2$ being the information on the angles of characteristic parts of the user's ear have already described above in detail with reference to FIG. 8b. In Table 5, the information on the head width of the user is expressed as HEAD, the information on the lengths of characteristic parts of the user's ear is expressed as PINN1 to PINN8, and the information on the angles of characteristic parts of the user's ear is expressed as PINN9 and PINN10. DMAX, which is the third byte of the personal head information data block of Table 5, indicates a highest value among HEAD, and PINN1 to PINN8. For example, DMAX may be signaled as shown below in Table 6.

TABLE 6

| | Bit | | | | | | | |
|---|---|---|---|---|---|---|---|---|
| | 7 | 6 | 5 | 4 | 3 | 2 | 1 | 0 |
| DMAX | I | I | I | I | I | F | F | F |

Referring to Table 6, the higher 5 bits are allocated as an Integer part (I), and the lower 3 bits are allocated as a Fractional part (F). Therefore, according to the bit combination, the integer part may indicate positive integers ranging from 0 to 31, and the fractional part may indicate 0, ⅛, . . . , ⅞. Units of the length value of the information being signaled through DMAX may be considered to be equal to centimeter units.

DIDX, which is the fourth byte of the personal head information data block, indicates an index of the information corresponding to DMAX. Herein, for example, HEAD may indicate index 0, and PINN1 to PINN8 may respectively indicates indexes 1 to 8. The DIDX may be expressed through the lower 4 bits of the fourth byte of the personal head information data block.

Starting from the fifth byte to the fifteenth byte of the personal head information data block, i.e., the values corresponding to HEAD, and PINN1 to PINN10 may each be divided by the DMAX value and may then be expressed in 8 bits in each of the corresponding bytes. Among HEAD, and PINN1 to PINN10, for example, PINN1 may be signaled as shown below in Table 7.

TABLE 7

| | Bit | | | | | | | |
|---|---|---|---|---|---|---|---|---|
| | 7 | 6 | 5 | 4 | 3 | 2 | 1 | 0 |
| PINN1 | I | F | F | F | F | F | F | F |

Referring to Table 7, the upper 1 bit is allocated as I, and the lower 7 bits are allocated as F. Therefore, according to the bit combination, the integer part may indicate 0 or 1, and the fractional part may indicate 0, 1/128, 2/128, . . . , 127/128. Since the values obtained by dividing HEAD, and PINN1 to PINN8 by DMAX are real numbers ranging from 0 to 1, inclusive, among 0, 1/128, 2/128, . . . , 127/128, the value most approximate to the values obtained by dividing HEAD, and PINN1 to PINN8 by DMAX may be indicated in each byte.

Referring back to Table 3, in case the flag indicating whether or not the room information is being used, e.g., the EID, indicates 1, the VR-AR audio data block of the extended data block may include room information (or room environment). As described above with reference to FIG. 8a, the room information may include at least one of may include at least one of information on a size of the room (800) in which the audio reproducing device (600) is located, information on a reflection coefficient of a substance (or material) configuring the room (800) in which the audio reproducing device (600) is located, information on a location of the user (810) within the room (800) in which the audio reproducing device (600) is located, and information on a gazing direction of the user (810). The room information may be obtained (or estimated) by the audio reproducing device (600) itself, or the room information may be obtained (or estimated) based on information received from at least one sensor communicating with the audio reproducing device (600). Alternatively, the room information may also be calculated by the audio reproducing device (600) based on the information received from at least one sensor, which exist(s) within the room (800) in which the audio reproducing device (600) is located. An example of the VR-AR audio data block related to the room information is as shown below in Table 8.

TABLE 8

| Byte# | bits | | | | | | | |
|---|---|---|---|---|---|---|---|---|
| | 7 | 6 | 5 | 4 | 3 | 2 | 1 | 0 |
| ROOMX | LengthX | | | | | | | |
| ROOMY | LengthY | | | | | | | |
| ROOMZ | LengthZ | | | | | | | |
| RELF | Reflection coefficient of floor | | | | | | | |
| RELC | Reflection coefficient of ceiling | | | | | | | |
| RELWL | Reflection coefficient of left wall relative to the PLP | | | | | | | |
| RELWR | Reflection coefficient of right wall relative to the PLP | | | | | | | |
| RELWF | Reflection coefficient of front wall relative to the PLP | | | | | | | |
| RELWB | Reflection coefficient of back wall relative to the PLP | | | | | | | |
| PX | PositionX | | | | | | | |
| PY | PositionY | | | | | | | |
| PZ | PositionZ | | | | | | | |
| OY | Orientation_Yaw | | | | | | | |
| OP | Orientation_Pitch | | | | | | | |
| OR | Orientation_Roll | | | | | | | |

The room information shown in Table 8 may be positioned between a $9^{th}$ byte and a $23^{rd}$ byte of the VR-AR audio data block shown in Table 3. ROOMX, ROOMY, and ROOMZ are information indicating the size of the room (800) in which the audio reproducing device (600) is located, and, under an assumption that the room is configured to have a cubic shape, ROOMX, ROOMY, and ROOMZ respectively indicate lengths along X-axis, Y-axis, and Z-axis directions in meter (m) units. Each of REFL, REFC, REFLWL, REFLWR, REFLWF, and REFLWB is information for respectively indicating reflection coefficients of a floor, a ceiling, a left-side wall, a right-side wall, a front-side wall, and a back-side wall of the room (800) in which the audio reproducing device (600) is located. The aforementioned information for indicating the reflection coefficients may be interpreted as information indicating quality of material characteristics of the substance (or material) configuring the room (800) in which the audio reproducing device (600) is located. Among the REFL, REFC, REFLWL, REFLWR, REFLWF, and REFLWB, for example, the REFL may be signaled as shown below in Table 9.

TABLE 9

| | Bit | | | | | | | |
|---|---|---|---|---|---|---|---|---|
| | 7 | 6 | 5 | 4 | 3 | 2 | 1 | 0 |
| REFL | I | F | F | F | F | F | F | F |

Referring to Table 9, the upper 1 bit is allocated as an Integer part (I), and the lower 7 bits are allocated as a Fractional part (F). Therefore, according to the bit combination, the integer part may indicate 0 or 1, and the fractional part may indicate 0, $1/128$, $2/128$, . . . , $127/128$. Since the reflection coefficients are real numbers ranging from 0 to 1, inclusive, among 0, $1/128$, $2/128$, . . . , $127/128$, the value most approximate to each of the REFL, REFC, REFLWL, REFLWR, REFLWF, and REFLWB may be indicated in each byte.

Referring back to Table 8, in Table 8, PX, PY, and PZ are information indicating the information on a location of the user (810) within the room (800) in which the audio reproducing device (600) is located, and PX, PY, and PZ respectively indicate coordinates of X-axis, Y-axis, and Z-axis directions in meter (m) units. OY, OP, and OR denote the gazing directions of the user (810) and indicate angle information in units of 1-degree intervals based on a Yaw axis, a Pitch axis, and a Roll axis, respectively.

Referring back to Table 3, in case DI1 indicates 1 and DI0 indicates 0, i.e., in case the bit value of the 3D audio signal type information indicates "10" and, accordingly, the VR audio bitstream is processed based on 6DoF, information indicating whether or not a Treadmill is used may be included in the fourth bit of the fourth byte in the VR-AR audio data block. As shown in Table 3, the information indicating whether or not a Treadmill is used may be expressed as Treadmill. In case the information indicating whether or not a Treadmill is used indicates 1, a Treadmill device may be operatively connected to the audio reproducing device (600) (e.g., HMD). And, in case the Treadmill device is operatively connected to the audio reproducing device (600), the audio reproducing device (600) may reproduce the 6DoF based audio content without being constrained (or restricted) by the reproduction room (or space).

In Table 3, in case DI1 and DI0 both indicates 1, i.e., in case the bit value of the 3D audio signal type information indicates "11" and, accordingly, the VR audio bitstream is processed based on 6DoF, each of information indicating whether or not a microphone is used in an AR environment, information on whether or not a stereo microphone is included in the audio reproducing device (600), information indicating whether or not sound being received through the microphone included in the audio reproducing device (600) is processed, and information indicating whether or not direction information of the microphone included in the audio reproducing device (600) is included may be included in each of the lower 4 bits of the fourth byte in the VR-AR audio data block.

In this embodiment, as shown in Table 3, the information indicating whether or not a microphone is used in an AR environment may be expressed as ARMIC, information on whether or not a stereo microphone is included in the audio reproducing device (600) may be expressed as StereoMIC, information indicating whether or not sound being received through the microphone included in the audio reproducing device (600) is processed may be expressed as Direct, and information indicating whether or not direction information of the microphone included in the audio reproducing device (600) is included may be expressed as Microphone Direction (MD).

In case ARMIC indicates 0, the audio reproducing device (600) does not use a microphone. For example, in case ARMIC indicates 0, the audio reproducing device (600) may be a set of open-type headphones or speakers. Conversely, in case ARMIC indicates 1, the audio reproducing device (600) may record or obtain sound outside of the audio reproducing device (600) through the microphone. For example, a microphone mounted on the headphones or earphones may record or obtain sound outside of the headphones or earphones. When ARMIC indicates 1, the VR-AR audio data block may include at least one of StereoMIC, Direct, and MD.

StereoMIC may indicate whether or not a stereo microphone (MIC) is included in the audio reproducing device (600), which is configured of two channels. In case StereoMIC indicates 1, a microphone may be included or mounted on both a left part and a right part of the audio reproducing device (600). For example, in case StereoMIC indicates 1, a microphone may be included or mounted on each of a left part and a right part of the headphones or earphones. Conversely, in case StereoMIC indicates 0, a microphone may be included or mounted on one of the left part and the right part of the audio reproducing device (600), or a microphone may be included or mounted on a center part of a band of the headphones (herein, a band of the headphones may denote a connecting part connecting the left part and the right part of the headphones).

In the AR environment, in some cases, external environment sound being received through the microphone may need to be treated (or processed) through signal processing. For example, in an environment having intense (or severe) surrounding environment noise, in case the user views AR content being reproduced through the audio reproducing device (600), the user eventually listens to the AR audio of the AR content and the surrounding environment noise at the same time, which may result in a degradation in a degree of absorption to the AR content. At this point, in case the audio reproducing device (600) transfers to the audio processing device (500) information indicating a need for processing (or treating) the environment sound of an external environment being received through the microphone, the environment sound of the external environment, which is received through the microphone of the audio reproducing device (600), may be signal-processed by the audio processing device (500). In case Direct indicates 1, the environment sound of the external environment, which is received through the microphone of the audio reproducing device (600), may be directly outputted without being processed with signal-processing. And, in case Direct indicates 0, the environment sound of the external environment, which is received through the microphone of the audio reproducing device (600), may be processed with signal-processing by the audio processing device (500). The operation performed by the audio processing device (500) of treating (or processing) the environment sound of the external environment, which is received through the microphone of the audio reproducing device (600), and the operation performed by the audio reproducing device (600) of receiving the environment sound of the external environment through the microphone may be performed simultaneously, i.e., in real-time.

In case MD indicates 1, this may indicate that the direction information of the microphone included in the audio reproducing device (600) exists. And, in case MD indicates 0, this may indicate that the direction information of the microphone included in the audio reproducing device (600) does not exist. In case StereoMIC indicates 1 (i.e., in case both MD and StereoMIC indicate 1), the direction information of the microphone included in the audio reproducing device (600) may include an azimuth of the left-side microphone, an elevation angle of the left-side microphone, an azimuth of the right-side microphone, and an elevation angle of the right-side microphone. Conversely, in case the StereoMIC indicates 0 (i.e., in case MD indicates 1 and StereoMIC indicates 0), the direction information of the microphone included in the audio reproducing device (600) may include an azimuth of the microphone and an elevation angle of the microphone.

Referring to Table 3, in case both MD and StereoMIC indicate 1, the VR-AR audio data block may include AZIM1 indicating an azimuth of the left-side microphone, ELEV1 indicating an elevation angle of the left-side microphone, AZIM2 indicating an azimuth of the right-side microphone, and ELEV2 indicating an elevation angle of the right-side microphone. Conversely, in case MD indicates 1 and StereoMIC indicates 0, the audio reproducing device (600) may only include AZIM1 indicating an azimuth of the microphone and ELEV1 indicating an elevation angle of the microphone.

The audio reproducing device (600) may transmit direction information of the microphone included in the audio reproducing device (600) to the audio processing device (500). And, when the audio processing device (500) processes an audio bitstream (or audio signal), by controlling (or adjusting) a gain of a sound being received through the microphone based on the direction information of the microphone included in the audio reproducing device (600), the audio processing device (500) may provide more natural 3D audio content to the user.

Meanwhile, a multi-user environment may denote an environment having at least one audio reproducing device, which communicates with the audio processing device (500) and the audio reproducing device (600), exist therein. The VR-AR audio data block shown in Table 3 shows MU, Master, User Count, MUMAX1, MUMAX2, and MUMAX3 in relation with the multi-user environment. The multi-user environment will be described later on in more detail with reference to FIG. 12.

In step 910, the audio processing device (500) may generate an audio signal by processing an audio bitstream based on information on a reproduction environment. For example, the audio processing device (500) may decode an audio bitstream based on the information on the reproduction environment and may generate an audio signal by rendering the decoded audio bitstream.

Since an audio signal is a broad concept denoting a signal that can be recognized by the auditory system of a human being, it shall be easily understood by anyone skilled in the art that an "audio signal" mentioned in this specification does not only refer to a signal having a specific processing process completed but may also refer to all signals being generated during a process of an audio bitstream being transferred to the user's ear as audio content after being processed by the audio processing device (500).

In step 920, the audio processing device (500) may generate an InfoFrame including characteristic information of a generated audio signal. An example of the InfoFrame is as shown below in Table 10.

TABLE 10

| InfoFrame Type Code | | | | | InfoFrame Type = 0x04 | | | |
|---|---|---|---|---|---|---|---|---|
| InfoFrame Version Number | | | | | Version = 0x01 | | | |
| Length of Audio InfoFrame | | | | | Length of Audio InfoFrame = 10 | | | |
| Data Byte 1 | CT3 | CT2 | CT1 | CT0 | F13 = 0 | CC2 | CC1 | CC0 |
| Data Byte 2 | F27 = 0 | F26 = 0 | F25 = 0 | SF2 | SF1 | SF0 | SS1 | SS0 |
| Data Byte 3 | F37 = 0 | F36 = 0 | F35 = 0 | CXT4 | CXT3 | CXT2 | CXT1 | CXT0 |
| Data Byte 4 | CA7 | CA6 | CA5 | CA4 | CA3 | CA2 | CA1 | CA0 |
| Data Byte 5 | DM_NH | LSV3 | LSV2 | LSV1 | LSV0 | F52 = 0 | LFEPBL1 | LFEPBL0 |
| Data Byte 6 | F67 = 0 | F66 = 0 | F65 = 0 | F64 = 0 | F63 = 0 | F62 = 0 | F61 = 0 | F60 = 0 |
| Data Byte 7 | F77 = 0 | F76 = 0 | F75 = 0 | F74 = 0 | F73 = 0 | F72 = 0 | F71 = 0 | F70 = 0 |

TABLE 10-continued

| | | | | | | | | |
|---|---|---|---|---|---|---|---|---|
| Data Byte 8 | F87 = 0 | F86 = 0 | F85 = 0 | F84 = 0 | F83 = 0 | F82 = 0 | F81 = 0 | F80 = 0 |
| Data Byte 9 | F97 = 0 | F96 = 0 | F95 = 0 | F94 = 0 | F93 = 0 | F92 = 0 | F91 = 0 | F90 = 0 |
| Data Byte 10 | VRA | DI1 | DI0 | HP | VREQ | MIC_On | Direct | Stereo |
| Data Byte 11 | MU_On | | | User Count | | | All_Active | Diegetic |
| Data Byte 12 | UID07 | UID06 | UID05 | UID04 | UID03 | UID02 | UID01 | UID00 |
| Data Byte 13 | UID15 | UID14 | UID13 | UID12 | UID11 | UID10 | UID09 | UID08 |
| Data Byte 14 | UID23 | UID22 | UID21 | UID20 | UID19 | UID18 | UID17 | UID16 |
| Data Byte 15 | UID31 | UID30 | UID29 | UID28 | UID27 | UID26 | UID25 | UID24 |

Each of the upper 3 bytes of Table 10 indicates a code identifying the type of the InfoFrame, a version of the InfoFrame, and a length of the InfoFrame. Characteristic information of the generated audio signal may be included between data byte 10 to data byte 15 of the InfoFrame.

VRA of the upper first bit of data byte 10 may have the same meaning as 3DA of the VR-AR audio data block included in the EDID. In other words, as an example of a 3D availability flag, VRA may indicate whether or not the audio reproducing device (600) can reproduce a 3D audio signal. Therefore, in case VRA indicates 1, the audio reproducing device (600) may reproduce a 3D audio signal, and, in case VRA indicates 0, this may indicate that the audio reproducing device (600) cannot reproduce a 3D audio signal. In an example, 3DA of the VR-AR audio data block included in the EDID and VRA of an InfoFrame generated based on the EDID may indicate the same information.

In case VRA included in the InfoFrame according to this embodiment indicates 1, the InfoFrame may additionally include DI1 and DI0, which are 3D audio signal type information, and HP, which is an example of information indicating whether the audio reproducing device (600) is a set of headphones or a speaker.

In case HP indicates 1, the audio reproducing device (600) reproducing the 3D audio signal may be a set of headphones. And, in case HP indicates 0, the audio reproducing device (600) reproducing the 3D audio signal may be a reproducing device other than the headphones. Reproducing devices other than the headphones may, for example, include a speaker. More specifically, in case HP indicates 0, the audio reproducing device (600) reproducing the 3D audio signal may be a speaker. In case HP indicates 0 and, accordingly, the audio reproducing device (600) is a speaker, the InfoFrame may include information indicating whether or not a response signal for cancelling audio signal distortion, which may occur in a room where the speaker is located, is generated. Herein, the information indicating whether or not a response signal for cancelling audio signal distortion, which may occur in a room where the speaker is located, is generated may, for example, be expressed as VREQ. In case HP indicates 0 and VREQ indicates 1, the audio processing device (500) generates a response signal for cancelling audio signal distortion based on the room information (or room environment) obtained through the EDID and may apply the generated response signal to the process of processing the 3D audio signal.

In Table 10, in case both DI1 and DI0 indicate 1, i.e., in case a bit value of the 3D audio signal type information indicates "11" and, accordingly, the AR audio bitstream is processed based on 6DoF, the InfoFrame may include MIC_On, which is information indicating whether or not the audio processing device (500) will process a bitstream of the sound received from the microphone of the audio reproducing device (600) together with the audio bitstream. In case MIC_On indicates 0, the audio processing device (500) does not process the bitstream of the sound received from the microphone of the audio reproducing device (600) together with the audio bitstream. And, in case MIC_On indicates 1, the audio processing device (500) may process the bitstream of the sound received from the microphone of the audio reproducing device (600) together with the audio bitstream.

In case MIC_On indicates 1, Direct, which is information indicating processing or non-processing of the sound received through the microphone included in the audio reproducing device (600), and Stereo, which is information indicating whether or not the bitstream of the sound received through the microphone included in the audio reproducing device (600) is in stereo, may be additionally included in the InfoFrame.

In this embodiment, in case Direct indicates 1 in Table 10, the environment sound of an external environment received through the microphone of the audio reproducing device (600) may be directly outputted without any separate signal processing. And, in case Direct indicates 0, the environment sound of an external environment received through the microphone of the audio reproducing device (600) may be treated (or processed) with signal processing. The operation performed by the audio processing device (500) of treating (or processing) the environment sound of the external environment, which is received through the microphone of the audio reproducing device (600), and the operation performed by the audio reproducing device (600) of receiving the environment sound of the external environment through the microphone may be performed simultaneously, i.e., in real-time.

In this embodiment, in case Stereo indicates 0 in Table 10, this may indicate that the bitstream of the sound received through the microphone of the audio reproducing device (600) is received in mono. And, in case Stereo indicates 1, this may indicate that the bitstream of the sound received through the microphone of the audio reproducing device (600) is received in stereo.

Meanwhile, MU_On, User Count, All_Active, and Diegetic, which are included in data byte 11 of the InfoFrame shown in Table 10, are information related to the multi-user environment in which at least one audio reproducing device communicating with the audio processing device (500) and the audio reproducing device (600) exists. Information on the multi-user environment will be described later on in more detail with reference to FIG. 12.

In step 930, the audio processing device may transmit the generated audio signal and the generated InfoFrame to the audio reproducing device.

According to the operating method of the audio processing device (500), which is described with reference to FIG. 9, the audio processing device (500) may generate a 3D audio signal (step 910) by processing an audio bitstream based on the information on a 3D reproduction environment of the audio reproducing device (600), which is received from the audio reproducing device (600) (step 900). And, then, the audio processing device (500) may generate an InfoFrame based on characteristic information of the 3D audio signal obtained during the process of processing the audio bitstream (step 920). Thereafter, the audio processing device (500) may transmit the generated 3D audio signal and the generated InfoFrame to the audio reproducing device (step 930). More specifically, according to the operating method of the audio processing device (500), while transmitting and receiving 3D audio data to and from the audio reproducing device (600), the audio processing device (500) may generate a 3D audio signal so as to enable the audio reproducing device (600) to more smoothly reproduce the 3D audio content.

Figure 10:
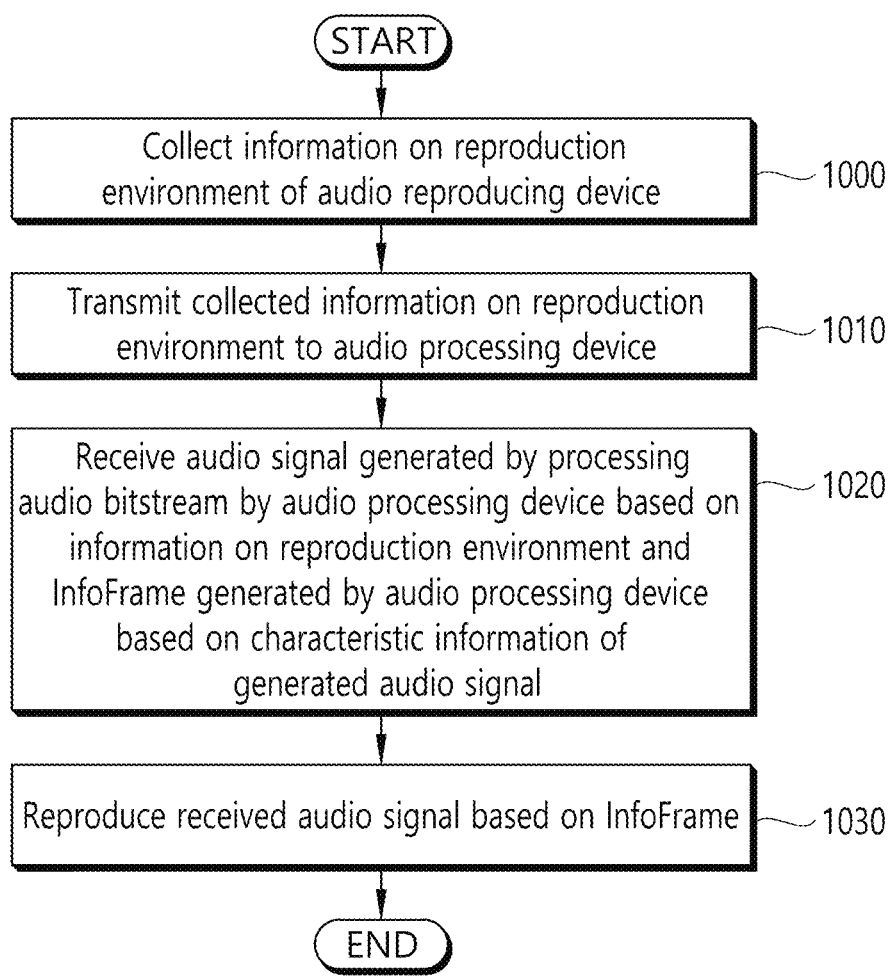
FIG. 10 is a flow chart showing a process of reproducing audio data by an audio reproducing device according to an embodiment of the present disclosure.

FIG. 10 is a flow chart showing a process of reproducing audio data by an audio reproducing device according to an embodiment of the present disclosure.

Each process step disclosed in FIG. 10 may be performed by the audio reproducing device (600) shown in FIG. 6. More specifically, for example, step 1000 of FIG. 10 may be performed by the metadata processor (610) of the audio reproducing device (600), step 1010 may be performed by the transmitter (620) of the audio reproducing device (600), step 1020 may be performed by the receiver (630) of the audio reproducing device (600), and step 1030 may be performed by the reproducer (640) of the audio reproducing device (600). Therefore, when describing each process step of FIG. 10, detailed description that are identical or similar to the description provided in FIG. 6 shall be omitted or briefly described.

Furthermore, since audio data, e.g., information on the reproduction environment of the audio reproducing device (600) and InfoFrame being transmitted and received between the audio processing device (500) and the audio reproducing device (600) have already been described above in detail, in FIG. 10, detailed description on the audio data being transmitted and received between the audio processing device (500) and the audio reproducing device (600) shall be omitted or briefly described.

In step 1000, the audio reproducing device (600) may collect information on the reproduction environment of the audio reproducing device (600). More specifically, the metadata processor (610) of the audio reproducing device (600) may collect information on the reproduction environment of the audio reproducing device (600) being embedded in a memory (not shown in FIG. 6) of the audio reproducing device (600). The information on the reproduction environment may, for example, include an EDID. However, the objects included in the information on the reproduction environment is not limited to the EDID.

In step 1010, the audio reproducing device (600) may transmit the collected information on the reproduction environment to the audio processing device (500). More specifically, the transmitter (620) of the audio reproducing device (600) may transmit the information on the reproduction environment to the audio processing device (500), after receiving the information on the reproduction environment from the metadata processor (610).

In step 1020, the audio reproducing device (600) may receive an audio signal, which is generated by processing an audio bitstream by the audio processing device (500) based on the information on the reproduction environment, and an InfoFrame, which is generated by the audio processing device (500) based on characteristic information of the generated audio signal, from the audio processing device (500). More specifically, the receiver (630) of the audio reproducing device (600) may receive an audio signal, which is generated by processing an audio bitstream, and an InfoFrame, which is generated by the audio processing device (500) based on characteristic information of the generated audio signal, from the transmitter (540) of the audio processing device (500).

At this point, the audio signal and InfoFrame generated from the audio processing device (500) may be simultaneously transmitted from the audio processing device (500) to the audio reproducing device (600). However, the embodiment of the present disclosure will not be limited only to this. And, for example, the generated audio signal may be transmitted first, or the generated InfoFrame may be transmitted first.

In step 1030, the audio reproducing device may reproduce an audio signal, which is received based on the InfoFrame. More specifically, the InfoFrame may be read by the metadata processor (610), and the information that is obtained by reading the InfoFrame may be transferred to the reproducer (640) from the metadata processor (610). The reproducer (640) may reproduce the received audio signal based on the information obtained by reading the InfoFrame. However, the method for reproducing the audio signal by the reproducer (640) will not be limited only to this. And, for example, the reproducer (640) may also reproduce the audio signal based on an InfoFrame, after directly receiving the audio signal and the InfoFrame from the receiver (630).

According to the operating method of the audio reproducing device (600), which is described with reference to FIG. 10, the audio reproducing device (600) may collect the information on the reproduction environment including information on the 3D audio reproduction of the audio reproducing device (600) (step 1000) and may transmit the collected information to the audio processing device (500) (step 1010). And, the audio reproducing device (600) may receive the 3D audio signal that is generated by the audio processing device (500) based on the information on the reproduction environment and the generated InfoFrame from the audio processing device (500) (step 1020). More specifically, while transmitting and receiving 3D audio data to and from the audio processing device (500), the audio reproducing device (600) may more smoothly reproduce the 3D audio content in accordance with the 3D audio reproduction environment of the audio reproducing device (600) (step 1030).

Figure 11A:
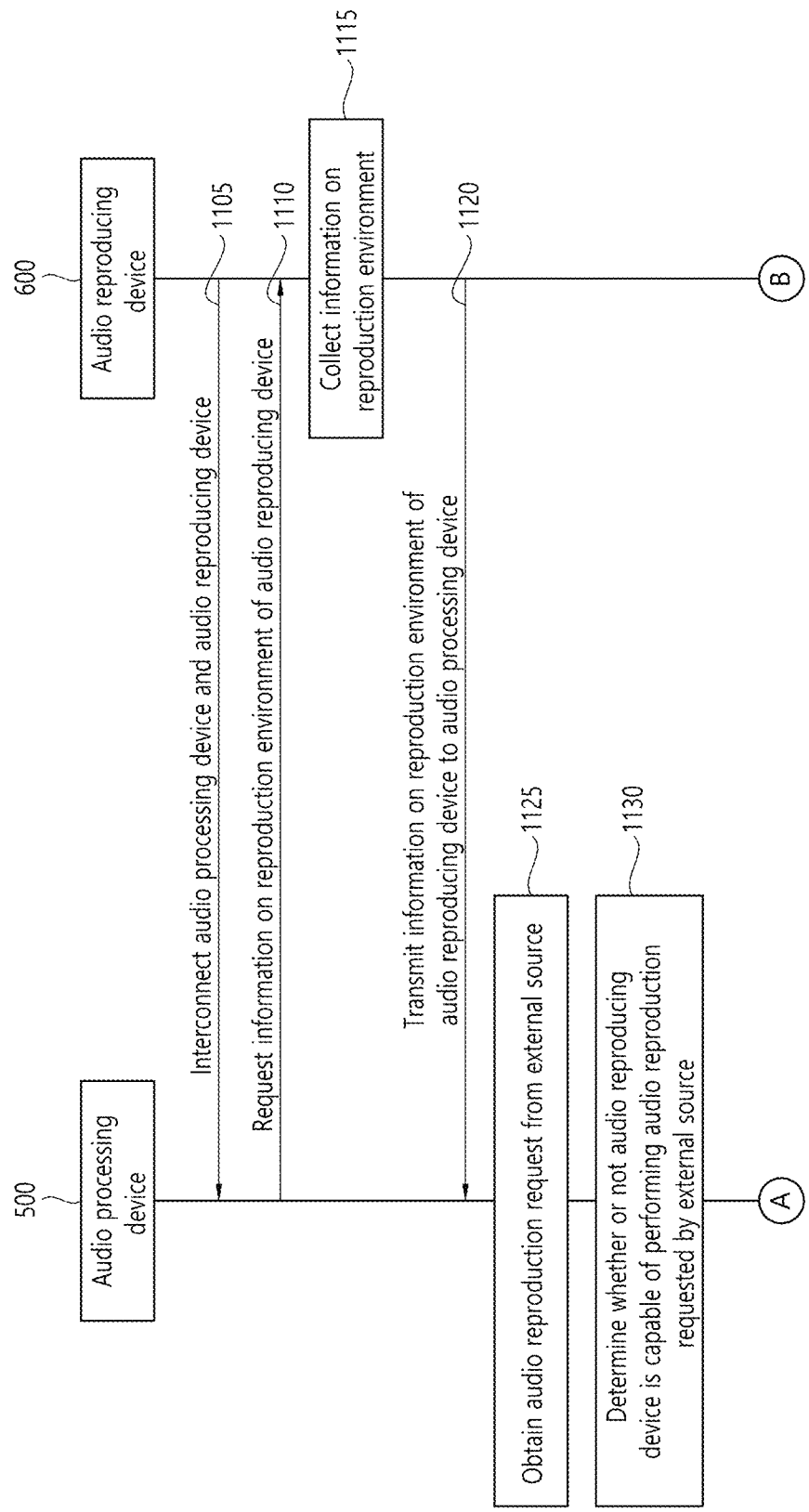
FIG. 11a and FIG. 11b are flow charts showing processes of transmitting and receiving audio data by an audio reproducing device according to an embodiment of the present disclosure.
Figure 11B:
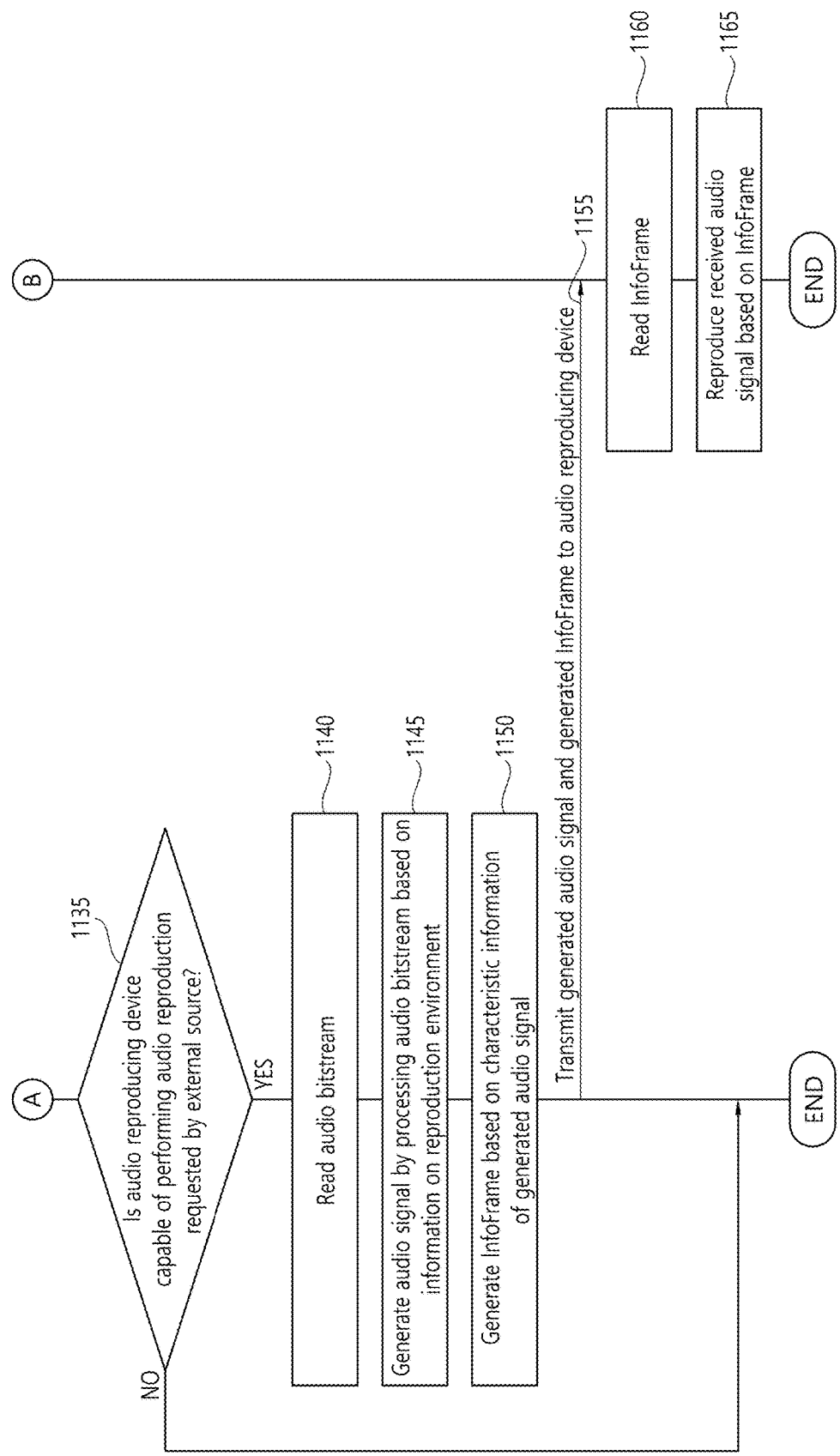

FIG. 11a and FIG. 11b are flow charts showing processes of transmitting and receiving audio data by an audio reproducing device according to an embodiment of the present disclosure.

In FIG. 11a and FIG. 11b, detailed description that are identical or similar to the description provided in FIG. 9 and FIG. 10 shall be omitted or briefly described. More specifically, for example, the operation of the audio reproducing device (600) according to step 1115 corresponds to the operation of the audio reproducing device (600) according to step 1000 in FIG. 10. The operations of the audio processing device (500) and the audio reproducing device (600) according to step 1120 corresponds to the operation of the audio processing device (500) according to step 900 of FIG. 9 and the operation of the audio reproducing device (600) according to step 1010 of FIG. 10. The operations of the audio processing device (500) according to step 1145 to step 1155 correspond to the operations of the audio processing device (500) according to step 910 to step 930 of FIG. 9. And, operations of the audio reproducing device (600) according to step 1155 and step 1165 correspond the operations of the audio reproducing device (600) according to step 1020 and step 1030 of FIG. 10. Therefore, the overlapping detailed description shall be omitted.

In step 1105, the audio processing device (500) and the audio reproducing device (600) may be interconnected.

More specifically, the audio reproducing device (600) may be interconnected to the audio processing device (500) by supplying a high-level voltage to a hot plug detect line of the audio processing device (500).

In step 1110, the audio processing device (500) may request information on the reproduction environment of the audio reproducing device (600). For example, the audio processing device (500) may request an EDID to the audio reproducing device (600) through a DDC.

In step 1115, the audio reproducing device (600) may collect the information on the reproduction environment.

In step 1120, the audio reproducing device (600) may transmit the information on the reproduction environment of the audio reproducing device (600) to the audio processing device (500). For example, the audio reproducing device (600) may transmit an EDID to the audio processing device (500) through the DDC.

In step 1125, the audio processing device (500) may obtain an audio reproduction request from an external source (or environment). For example, the audio processing device (500) may obtain an audio reproduction request from a user through a user interface (UI). However, the example will not be limited only to this. In another example, the audio processing device (500) may receive an audio reproduction request signal from an external audio processing device, or may receive an audio reproduction request signal from the audio reproducing device (600), or may receive an audio reproduction request signal from a network/broadcasting network.

In step 1130, the audio processing device (500) may determine whether or not the audio reproducing device (600) can perform the audio reproduction, which is requested from an external source (or environment), based on the information on the reproduction environment of the audio reproducing device (600).

In step 1135, according to the result of determining whether or not the audio reproducing device (600) can perform the audio reproduction, which is requested from an external source (or environment), the audio reproduction process may be ended (or terminated) or may proceed to step 1140.

In case it is determined that the audio reproducing device (600) can perform the audio reproduction, which is requested from an external source (or environment), in step 1140, the audio processing device (500) may read an audio bitstream.

In step 1145, the audio processing device (500) may generate an audio signal by processing an audio bitstream based on the information on the reproduction environment of the audio reproducing device (600).

In step 1150, the audio processing device (500) may generate an InfoFrame based on characteristic information of the generated audio signal.

In step 1155, the audio processing device (500) may transmit the generated audio signal and the generated InfoFrame to the audio reproducing device (600).

In step 1160, the audio reproducing device (600) may read the InfoFrame.

In step 1165, the audio reproducing device (600) may reproduce the received audio signal based on the InfoFrame.

Figure 12A:
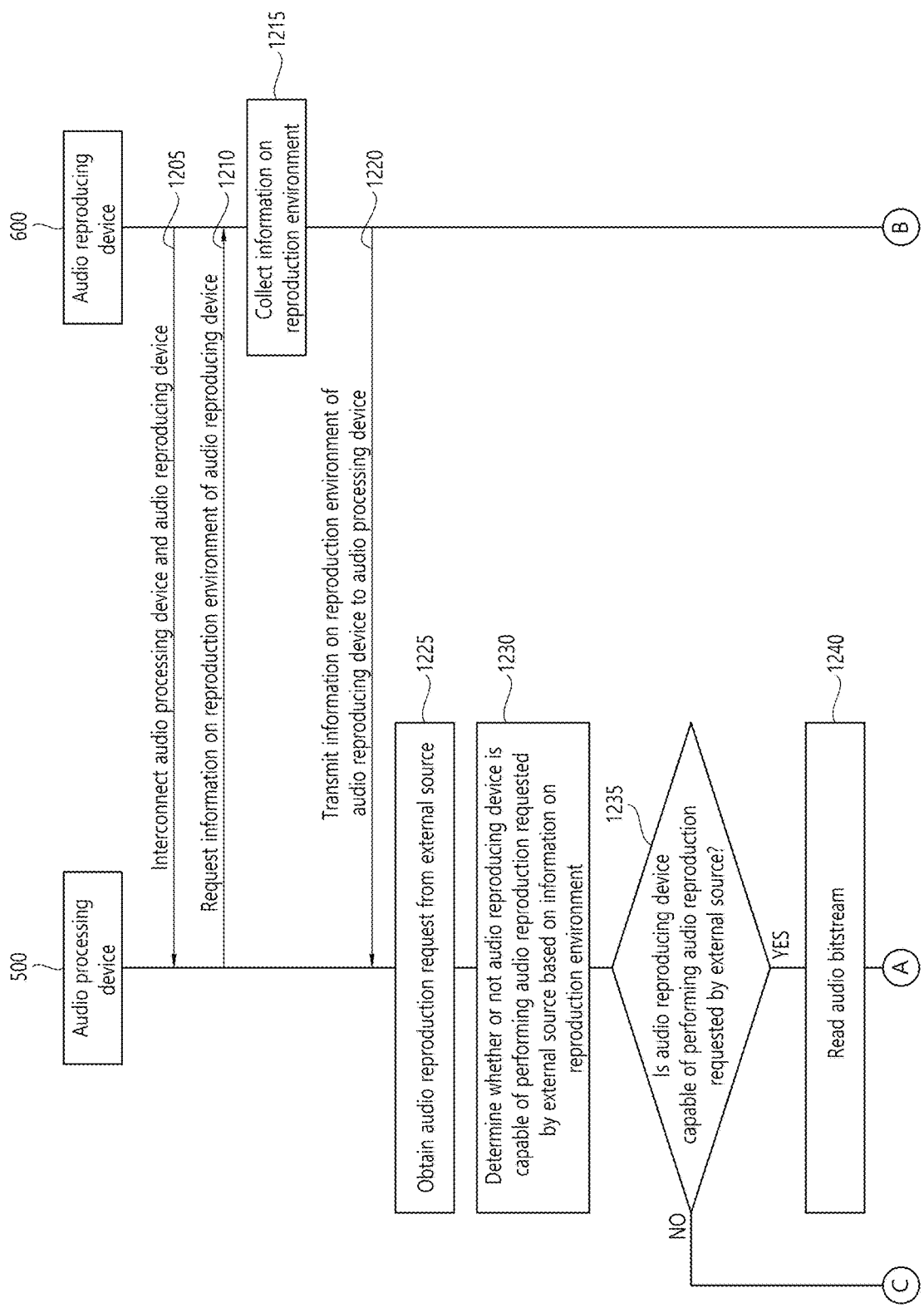

FIG. 12a and FIG. 12b are flow charts showing processes of transmitting and receiving audio data by an audio reproducing device, in a multi-user environment, according to an embodiment of the present disclosure.

In FIG. 12a and FIG. 12b, detailed description that are identical or similar to the description provided in FIG. 9 to FIG. 11b shall be omitted or briefly described. More specifically, for example, the operation of the audio reproducing device (600) according to step 1205 corresponds to the operation of the audio reproducing device (600) according to step 1105 in FIG. 11a. The operation of the audio processing device (500) according to step 1210 corresponds to the operation of the audio processing device (500) according to step 1110 of FIG. 11a. The operation of the audio reproducing device (600) according to step 1215 corresponds to the operation of the audio reproducing device (600) according to step 1000 in FIG. 10. The operations of the audio processing device (500) and the audio reproducing device (600) according to step 1220 corresponds to the operation of the audio processing device (500) according to step 900 of FIG. 9 and the operation of the audio reproducing device (600) according to step 1010 of FIG. 10. The operations of the audio processing device (500) according to step 1225 to step 1240 correspond to the operations of the audio processing device (500) according to step 1125 to step 1140 of FIG. 11a and FIG. 11b. The operation of the audio processing device (500) according to step 1270 corresponds to the operation of the audio processing device (500) according to step 930 of FIG. 9. And, operations of the audio reproducing device (600) according to step 1275 and step 1280 correspond the operations of the audio reproducing device (600) according to step 1020 and step 1030 of FIG. 10. Therefore, the overlapping detailed description shall be omitted.

In step 1205, the audio processing device (500) and the audio reproducing device (600) may be interconnected.

In step 1210, the audio processing device (500) may request information on the reproduction environment of the audio reproducing device (600).

In step 1215, the audio reproducing device (600) may collect the information on the reproduction environment.

In step 1220, the audio reproducing device (600) may transmit the information on the reproduction environment of the audio reproducing device (600) to the audio processing device (500).

In step 1225, the audio processing device (500) may obtain an audio reproduction request from an external source (or environment).

In step 1230, the audio processing device (500) may determine whether or not the audio reproducing device (600) can perform the audio reproduction, which is requested from an external source (or environment), based on the information on the reproduction environment of the audio reproducing device (600).

In step 1235, according to the result of determining whether or not the audio reproducing device (600) can perform the audio reproduction, which is requested from an external source (or environment), the audio reproduction process may be ended (or terminated) or may proceed to step 1240.

In case it is determined that the audio reproducing device (600) can perform the audio reproduction, which is requested from an external source (or environment), in step 1240, the audio processing device (500) may read an audio bitstream.

In step 1260, the audio processing device (500) may generate an audio signal by processing an audio bitstream and a multi-user audio bitstream based on the information on the reproduction environment of the audio reproducing device (600). More specifically, as described above in FIG. 7, the audio decoder (532) of the audio processing device (500) according to this embodiment may decode the audio bitstream based on the information on the reproduction environment of the audio reproducing device (600), and a multi-user audio decoder of the audio processing device (500) according to this embodiment may decode the multi-user audio bitstream based on the information on the reproduction environment of the audio reproducing device (600). The renderer (534) of the audio processing device (500) according to this embodiment may synthesize the audio signal processed by the audio decoder (532) and the audio signal processed by the multi-user audio decoder and may then render the synthesized audio signal.

The information on the reproduction environment of the audio reproducing device (600) according to this embodiment may include MU, User Count, MUMAX1, MUMAX2, and MUMAX3, which are information related to the multi-user environment, in the VR-AR audio data block, as shown in Table 3 of FIG. 9. The information related to the multi-user environment will be examined in more detail through by referring to Table 11 shown below.

TABLE 11

| Byte# | bits | | | | | | | |
|---|---|---|---|---|---|---|---|---|
| | 7 | 6 | 5 | 4 | 3 | 2 | 1 | 0 |
| 5 | F57 = 0 | MU | Master | User Count | | | | |
| MUMAX1 | MU_Xmax | | | | | | | |
| MUMAX2 | MU_Ymax | | | | | | | |
| MUMAX3 | MU_Zmax | | | | | | | |

In Table 11, MU is information indicating whether or not the environment is a multi-user environment. In other words, MU of Table 11 may correspond to an example of a multi-user flag indicating the presence or absence of at least one audio reproducing device communicating with the audio processing device (500) and the audio reproducing device (600). In case MU indicates 0, this may indicate a single-user environment, wherein the audio processing device (500) and the audio reproducing device (600) perform one-to-one transmission and reception to and from one another. Conversely, in case MU indicates 1, this may indicate a multi-user environment in which at least one audio reproducing device communicating with the audio processing device (500) and the audio reproducing device (600) exists. In case MU indicates 1, the VR-AR audio data block may additionally include Master, User Count, MUMAX1, MUMAX2, and MUMAX3.

In Table 11, Master is information indicating whether the audio reproducing device (600) of the multi-user environment, wherein at least one audio reproducing device communicating with the audio processing device (500) and the audio reproducing device (600) exists, is a master device. In other words, Master may correspond to an example of a flag indicating whether the audio reproducing device (600) is a master device communicating with at least one audio reproducing device being the sub-device. In case Master indicates 0, the audio reproducing device (600) does not need to include information related to the multi-user environment in the information on the reproduction environment of the audio reproducing device (600) and transmit the information to the audio processing device (500). Conversely, in case Master indicates 1, the audio reproducing device (600) shall include information related to the multi-user environment in the information on the reproduction environment of the audio reproducing device (600) and transmit the information to the audio processing device (500). The information related to the multi-user environment may include, for example, User Count, MUMAX1, MUMAX2, and MUMAX3, and location information of each multi-user, which will be described later on.

In Table 11, User Count may denote a total number of the audio reproducing device (600) and the at least one audio reproducing device in the multi-user environment, wherein at least one audio reproducing device communicating with the audio processing device (500) and the audio reproducing device (600) exists. In other words, User Count may mean a total number of users simultaneously using the same audio content. Referring to Table 11, since 5 bits are used in order to indicate the User Count, a total of 32 multi-users may be expressed through the User Count.

In Table 11, MU_Xmax being expressed through MUMAX1 may indicate a largest value (or maximum value) among X-axis location information values of the multi-users, MU_Ymax being expressed through MUMAX2 may indicate a largest value (or maximum value) among Y-axis location information values of the multi-users, and MU_Zmax being expressed through MUMAX3 may indicate a largest value (or maximum value) among Z-axis location information values of the multi-users. Each of MUMAX1, MUMAX2, and MUMAX3 may be allocated with 8 bits and may express up to 256 in meter units. MU_Xmax, MU_Ymax, and MU_Zmax may be used in order to express the location information of each multi-user more efficiently.

The location information of each multi-user and, most particularly, information related to the location of each of the at least one audio reproducing device communicating with the audio processing device (500) and the audio reproducing device (600) and the audio reproducing device (600) may, for example, be expressed as shown below in Table 12.

TABLE 12

| Byte# | bits | | | | | | | |
|---|---|---|---|---|---|---|---|---|
| | 7 | 6 | 5 | 4 | 3 | 2 | 1 | 0 |
| User1 | F17 = 0 | F16 = 0 | F15 = 0 | F14 = 0 | User ID | | | |
| U1_X | X | | | | | | | |
| U1_Y | Y | | | | | | | |
| U1_Z | Z | | | | | | | |
| User2 | F17 = 0 | F16 = 0 | F15 = 0 | F14 = 0 | User ID | | | |
| U2_X | X | | | | | | | |
| U2_Y | Y | | | | | | | |
| U2_Z | Z | | | | | | | |

Table 12 shows information on a first user (User1) and a second user (User2). When examining the table with reference to the first user, User ID denotes identification information of the first user, U1_X denotes X-axis location information value of the first user, U1_Y denotes Y-axis location information value of the first user, and U1_Z denotes Z-axis location information value of the first user.

Meanwhile, as described above, the information related to the multi-user environment may be included in the information on the reproduction environment of the audio reproducing device (600) only when the audio reproducing device (600) is the Master device. Therefore, according to an embodiment based on Table 12, the location information of each multi-user may be included in the information on the reproduction environment of the audio reproducing device (600), which is the Master device, and may then be transmitted to the audio processing device (500) from the audio reproducing device (600). As described above, in a situation where one audio processing device (500) communication with a plurality of audio reproducing devices, instead of having each of the plurality of audio reproducing devices transmit the location information of each multi-user, by having the audio reproducing device, which is the master device, transmit the location information of all of the multi-users, efficiency in data transmission in the multi-user environment may be enhanced. However, the present disclosure will not be limited only to this embodiment. And, therefore, in some cases, each of the plurality of audio reproducing devices may also transmit the location information of each multi-user.

In Table 12, although it is assumed that two users exist in the multi-user environment, since the maximum value of the above-described User Count is equal to 32, it shall be easily understood by anyone skilled in the art that location information of a maximum of 32 multi-users may be indicated by using a method that is similar to the method shown in Table 12. Additionally, it shall also be easily understood by anyone skilled in the art that, although Table 12 indicates the location information of each multi-user by using a XYZ coordinate system, the present disclosure will not be limited only to this embodiment, and that the location information of each multi-user may also be indicated by using other various coordinate systems, such as polar coordinates, and so on.

The location information of each multi-user shown in Table 12 may be located in the lowermost bytes of the VR-AR audio data block. For example, the location information of each multi-user shown in Table 12 may be located starting from the lower end of ELEV2 of the VR-AR audio data block shown in Table 3. However, the present disclosure will not be limited only to this embodiment. And, therefore, for example, the location information of each multi-user may be separately included in one of the extended data blocks and may then be transmitted (or signaled) to the audio processing device (500) from the audio reproducing device (600).

The location information of each multi-user, e.g., U1_X, U1_Y, and U1_Z, which are the location information of the first user, are relative location values that are based on an initial location value of the user. This may be expressed, for example, as shown below in Table 13.

TABLE 13

| | Bit | | | | | | |
|---|---|---|---|---|---|---|---|
| 7 | 6 | 5 | 4 | 3 | 2 | 1 | 0 |
| U1_X S | I | F | F | F | F | F | F |

In Table 13, S represents a Sign, which may indicate plus or minus. I may denote an Integer part, and F may denote a Fractional part. Since 1 bit is allocated as I, the Integer part may indicate 0 or 1. And, since 6 bits are allocated as F, the fractional part may indicate $0, 1/64, \ldots, 63/64$. According to Table 13, U1_X may indicate real numbers $-63/64, -62/64, \ldots, 0, 1/64, \ldots, 63/64$. The U1_X value according to Table 13 is a normalized value, and when this value is multiplied by the MU_Xmax value of Table 11, the X-axis location information value of the first user may be obtained. Similarly, when the U1_Y value is multiplied by the MU_Ymax value, the Y-axis location information value of the first user may be obtained. And, when the U1_Z value is multiplied by the MU_Zmax value, the Z-axis location information value of the first user may be obtained.

In step 1265, the audio processing device (500) may generate an InfoFrame based on characteristic information of the generated audio signal.

In order to examine the information related to the multi-user environment in the InfoFrame according to Table 10 of FIG. 9, reference will be made to Table 14 shown below.

TABLE 14

| InfoFrame Type Code | | | | InfoFrame Type = 0x04 | | | | |
|---|---|---|---|---|---|---|---|---|
| InfoFrame Version Number | | | | Version = 0x01 | | | | |
| Length of Audio InfoFrame | | | | Length of Audio InfoFrame = 10 | | | | |
| Data Byte 11 | MU_On | | | User Count | | | All_Active | Diegetic |
| Data Byte 12 | UID07 | UID06 | UID05 | UID04 | UID03 | UID02 | UID01 | UID00 |
| Data Byte 13 | UID15 | UID14 | UID13 | UID12 | UID11 | UID10 | UID09 | UID08 |
| Data Byte 14 | UID23 | UID22 | UID21 | UID20 | UID19 | UID18 | UID17 | UID16 |
| Data Byte 15 | UID31 | UID30 | UID29 | UID28 | UID27 | UID26 | UID25 | UID24 |

According to this embodiment, the InfoFrame may include a multi-user bitstream flag, which indicates whether or not at least one audio reproducing device communicating with the audio processing device (500) and the audio reproducing device (600) exists and whether a multi-user bitstream, which is obtained based on a sound that is recorded through microphones (MICs) of the audio reproducing device (600) and the at least one audio reproducing device, is used when processing an audio signal. As shown in Table 14, the multi-user bitstream flag may be expressed as MU_On.

In case MU_On indicates 0, the information related to the multi-user environment may not be included in the InfoFrame. And, in case MU_On indicates 1, the information related to the multi-user environment may be included in the InfoFrame. More specifically, in case MU_On indicates 1, User Count, All_Active, Diegetic, and ID information of the multi-users, which are shown in Table 14, may be included in the InfoFrame.

In this embodiment, User Count of Table 14 may denote a number of multi-users communicating with the audio processing device (500) in a multi-user environment. In other words, User Count may denote a total number of the audio reproducing device (600) and the at least one audio reproducing device in the multi-user environment, wherein at least one audio reproducing device communicating with the audio processing device (500) and the audio reproducing device (600) exists. Referring to Table 14, since 5 bits are used in order to indicate the User Count, a total of 32 multi-users may be expressed through the User Count. The usage of 5 bits for indicating the User Count is the same as using 5 bits for indicating the User Count in the VR-AR audio data block of Table 11. However, the present disclosure will not be limited only to this embodiment. And, therefore, User Count may also be expressed through bits other than 5 bits.

In this embodiment, All_Active of Table 14 may indicate whether or not all of the multi-user bitstreams obtained by the audio processing device (500) are synthesized with the audio bitstream. In other words, All_Active may correspond to an example of indicating information on whether or not all of the multi-user bitstreams are used when the audio processing device (500) processes the audio bitstream. In case All_Active indicates 1, this may denote that all of the multi-user bitstreams by the multi-users, which are included in the User Count, are synthesized with the audio bitstream, when the audio processing device (500) processes the audio bitstream. Conversely, when All_Active indicates 0, this may denote that not all of the multi-user bitstreams by the multi-users, which are included in the User Count, are synthesized with the audio bitstream, when the audio processing device (500) processes the audio bitstream.

In this embodiment, in case All_Active indicates 0, the InfoFRame may include information on whether or not a multi-user bitstream corresponding to each of the at least one audio reproducing device communicating with the audio processing device (500) and the audio reproducing device (600) and the audio reproducing device (600) is used, when the audio processing device (500) processes the audio bitstream. More specifically, referring to Table 14, in case All_Active indicates 0, the InfoFrame may include part of UID00 to UID32 based on the User Count value. For example, in case the User Count value is equal to 5, the InfoFrame may include UID00 to UID04.

UIDXX (herein, XX may indicate one integer from 00 to 32) may indicate each multi-user. And, in case UIDXX indicates 1, this may denote that the multi-user bitstream of the corresponding multi-user is synthesized with the audio bitstream. And, in case UIDXX indicates 0, this may denote that the multi-user bitstream of the corresponding multi-user is not synthesized with the audio bitstream. Meanwhile, although this embodiment describes a case where the UIDXX (herein, XX may indicate one integer from 00 to 32) is included in the InfoFrame only when All_Active of Table 14 indicates 0, the present disclosure will not be limited only to this. For example, regardless of the information indicated by All_Active, the InfoFrame may include UIDXX (herein, XX may indicate one integer from 00 to 32).

In this embodiment, Diegetic of Table 14 may indicate an example of information on whether or not imaging is applied to the multi-user bitstream. Location information of each multi-user may be included in the information on the reproduction environment of the audio reproducing device (600), which is received by the audio processing device (500) from the audio reproducing device (600). In case the audio processing device (500) considers the multi-user bitstream as an object type audio and applies imaging corresponding to the location of each multi-user and then synthesizes the processed bitstream with the audio bitstream, the user may determine the location of other multi-users by using the VR or AR content. In case Diegetic indicates 1, imaging may be applied to the multi-user bitstream, and, in case Diegetic indicates 0, imaging may not be applied to the multi-user bitstream.

In step 1270, the audio processing device (500) may transmit the generated audio signal and the generated InfoFrame to the audio reproducing device (600).

In step 1275, the audio reproducing device (600) may read the InfoFrame.

In step 1280, the audio reproducing device (600) may reproduce the received audio signal based on the InfoFrame.

Meanwhile, throughout the present specification, although the information on the reproduction environment of the audio reproducing device (600) or the InfoFrame have been expressed as shown in Table 1 to Table 14, the method for expressing the information on the reproduction environment of the audio reproducing device (600) or the InfoFrame will not be limited only to the method shown in Table 1 to Table 14. For example, the information on the reproduction environment of the audio reproducing device (600) may be expressed as shown in FIG. 13.

Internal components of the above-described device (or apparatus) may be processors executing consecutive process steps that are stored in a memory or may be hardware components configured of other hardware. Such internal components may be located inside/outside of the device (or apparatus).

The above-described modules may be omitted depending upon the embodiment or may be replaced with other modules performing similar/identical operations.

Each part, module or unit described above may be a processor or a hardware part that is stored in a memory (or a storage unit) and performs consecutive processes. Each step described in the aforementioned embodiments may be performed by a processor or hardware parts. Each module/block/unit described in the aforementioned embodiments may operate as hardware/processors. In addition, the methods proposed by the present disclosure may be executed by using a code. This code may be written in a processor-readable storage medium and thus may be read by a processor provided by the apparatus (or device).

In the above-described embodiments, although the methods have been described based on the flowcharts using a series of the steps or blocks, the present disclosure is not limited to the sequence of the steps, and some steps may be performed at different sequences from the above-described steps or may be performed simultaneously with the steps. For example, although the operation according to step S920 of FIG. 9 may be performed after performing the operation according to step S910 and the operation according to step S920 may be performed simultaneously by the audio processing device (500). Furthermore, those skilled in the art will understand that the steps shown in the flowcharts are not exclusive and may include other steps or one or more steps of the flowcharts may be deleted without affecting the scope of the present disclosure.

When the embodiments are realized by software in the present disclosure, the above-described methods may be realized by a module (a process, a function, etc.) that perform the above-described functions. The module may be stored in a memory and executed by a processor. The memory may be provided inside or outside the processor and connected to the processor through various known means. The processor may include an application-specific integrated circuit (ASIC), other chipsets, a logic circuit and/or a data processing apparatus. The memory may include a read-only memory (ROM), a random access memory (RAM), a flash memory, a memory card, a storage medium and/or other storage devices.

Internal components of the above-described device (or apparatus) may be processors executing consecutive process steps that are stored in a memory or may be hardware components configured of other hardware. Such internal components may be located inside/outside of the device (or apparatus).

The above-described modules may be omitted depending upon the embodiment or may be replaced with other modules performing similar/identical operations.

Each part, module or unit described above may be a processor or a hardware part that is stored in a memory (or a storage unit) and performs consecutive processes. Each step described in the aforementioned embodiments may be performed by a processor or hardware parts. Each module/block/unit described in the aforementioned embodiments may operate as hardware/processors. In addition, the methods proposed by the present disclosure may be realized by code. This code may be written in a processor-readable storage medium and thus may be read by a processor provided by the apparatus.

In the above-described embodiments, although the methods have been described based on the flowcharts using a series of the steps or blocks, the present disclosure is not limited to the sequence of the steps, and some steps may be performed at different sequences from the above-described steps or may be performed simultaneously with the steps. Furthermore, those skilled in the art will understand that the steps shown in the flowcharts are not exclusive and may include other steps or one or more steps of the flowcharts may be deleted without affecting the scope of the present disclosure.

When the embodiments are realized by software in the present disclosure, the above-described methods may be realized by a module (a process, a function, etc.) that perform the above-described functions. The module may be stored in a memory and executed by a processor. The memory may be provided inside or outside the processor and connected to the processor through various known means. The processor may include an application-specific integrated circuit (ASIC), other chipsets, a logic circuit and/or a data processing apparatus. The memory may include a read-only memory (ROM), a random access memory (RAM), a flash memory, a memory card, a storage medium and/or other storage devices.

What is claimed is:

1. An audio data processing method performed by an audio processing device, the audio data processing method comprising:
   receiving information on a reproduction environment of an audio reproducing device from the audio reproducing device;
   generating an audio signal by processing an audio bitstream based on the information on reproduction environment;
   generating an info frame including characteristic information of the generated audio signal; and
   transmitting the generated audio signal and the generated info frame to the audio reproducing device,
   wherein the audio bitstream includes a Virtual Reality (VR) audio bitstream or an Augmented Reality (AR) audio bitstream,
   wherein the information on a reproduction environment includes an Extended Display Identification Data standard (EDID), and
   wherein the EDID includes a VR-AR audio data block which includes 3D audio signal type information for representing at least one of 3DoF, 3DoF+, or 6DoF.

2. The method of claim 1, wherein the information on a reproduction environment indicates information related to at least one of status and reproduction capability of the audio reproducing device.

3. The method of claim 2, wherein the EDID includes a CTA data block, the CTA data block includes an extended data block, and the extended data block includes the VR-AR audio data block.

4. The method of claim 3, wherein the VR-AR audio data block includes a multi-user flag indicating whether or not at least one audio reproducing device communicating with the audio processing device and the audio reproducing device exists, and
   wherein, in case the multi-user flag indicates 1, the VR-AR audio data block includes a flag indicating whether the audio reproducing device communicating with the at least one audio reproducing device being a sub-device is a master device.

5. The method of claim 4, wherein, in case the flag indicating whether the audio reproducing device is the master device indicates 1, the VR-AR audio data block includes at least one of information indicating a total number of the at least one audio reproducing device and the audio reproducing device and information on locations of each of the at least one audio reproducing device and the audio reproducing device.

6. The method of claim 3, wherein the VR-AR audio data block includes a first 3-dimensional (3D) availability flag indicating whether or not the audio reproducing device is capable of reproducing a 3D audio signal, and
   wherein, in case the first 3D availability flag indicates 1, the VR-AR audio data block includes a flag indicating whether or not characteristic of a user's ear is used, and a flag indicating whether or not room information is used.

7. The method of claim 6, wherein, in case the first 3D availability flag indicates 1, the VR-AR audio data block includes 3D audio signal type information, and
   wherein, in case a bit value of the 3D audio signal type information indicates "00", the VR audio bitstream is processed based on 3DoF, and, in case a bit value of the 3D audio signal type information indicates "01", the VR audio bitstream is processed based on a DoF greater than 3DoF, and, in case a bit value of the 3D audio signal type information indicates "10", the VR audio bitstream is processed based on 6DoF, and, in case a bit value of the 3D audio signal type information indicates "11", the AR audio bitstream is processed based on 6DoF.

8. The method of claim 6, wherein, in case the first 3D availability flag indicates 1, the VR-AR audio data block includes a flag indicating whether or not characteristic of a user's ear is used, and
   wherein, in case the flag indicating whether or not characteristic of a user's ear is used indicates 1, the extended data block includes a Personal Head Information Data Block.

9. The method of claim 8, wherein the Personal Head Information Data Block includes information on a head width of a user and information on lengths or angles of characteristic parts of the user's ear.

10. The method of claim 6, wherein, in case the first 3D availability flag indicates 1, the VR-AR audio data block includes a flag indicating whether or not room information is used, and
    wherein, in case the flag indicating whether or not room information is used indicates 1, the VR-AR audio data block includes at least one of information on a size of a room in which the audio reproducing device is located, information on a reflection coefficient of a substance configuring the room in which the audio reproducing device is located, information on a location of the user within the room in which the audio reproducing device is located, and information on a gazing direction of the user.

11. The method of claim 10, wherein the room information is obtained based on at least one sensor existing within the room in which the audio reproducing device is located.

12. The method of claim 1, wherein the VR-AR characteristic information includes a second 3D availability flag indicating whether or not the audio reproducing device is capable of reproducing a 3D audio signal, and wherein, in case the second 3D availability flag indicates 1, the VR-AR characteristic information includes at least one of second 3D audio signal type information, information indicating whether the audio reproducing device is a headphone or a speaker, and a multi-user bitstream flag indicating whether or not at least one audio reproducing device communicating with the audio processing device and the audio reproducing device exists and whether a multi-user bitstream obtained based on a sound being recorded through microphones (MICs) of the audio reproducing device and the at least one audio reproducing device is used when processing an audio signal.

13. The method of claim 12, wherein, in case the second 3D availability flag indicates 1, the VR-AR characteristic information includes the second 3D audio signal type information, and wherein, in case the second 3D audio signal type information indicates "00", the VR audio bitstream is processed based on 3DoF, and, in case the second 3D audio signal type information indicates "01", the VR audio bitstream is processed based on a DoF greater than 3DoF, and, in case the second 3D audio signal type information indicates "10", the VR audio bitstream is processed based on 6DoF, and, in case the second 3D audio signal type information indicates "11", the AR audio bitstream is processed based on 6DoF.

14. The method of claim 12, wherein, in case the second 3D availability flag indicates 1, the VR-AR characteristic information includes the information indicating whether the audio reproducing device is a headphone or a speaker, and wherein, in case the information indicating whether the audio reproducing device is a headphone or a speaker indicates 1, the audio reproducing device is a headphone, and wherein, in case the information indicating whether the audio reproducing device is a headphone or a speaker indicates 0, the audio reproducing device is a speaker, and the VR-AR characteristic information includes information indicating whether or not a response signal for cancelling audio signal distortion occurring in a room where the speaker is located is generated.

15. The method of claim 12, wherein the VR-AR characteristic information includes the multi-user bitstream flag, and wherein, in case the multi-user bitstream flag indicates 1, the VR-AR characteristic information includes information on a total number of the audio reproducing device and the at least one audio reproducing device, information on whether or not all of the multi-user bitstreams are used when processing the audio bitstream, and information on whether or not imaging is applied to the multi-user bitstream.

16. The method of claim 15, wherein, in case the multi-user bitstream flag indicates 1, the VR-AR characteristic information includes information on whether or not all of the multi-user bitstreams are used when processing the audio bitstream, and wherein, in case information on whether or not all of the multi-user bitstreams are used when processing the audio bitstream indicates 1, all of the multi-user bitstreams are synthesized with the audio bitstream when processing the audio bitstream.

17. The method of claim 15, wherein, in case the multi-user bitstream flag indicates 1, the VR-AR characteristic information includes information on whether or not all of the multi-user bitstreams are used when processing the audio bitstream, and wherein, in case information on whether or not all of the multi-user bitstreams are used when processing the audio bitstream indicates 0, the VR-AR characteristic information includes information on whether or not a multi-user bitstream corresponding to each of the audio reproducing device and the at least one audio reproducing device is used, when processing the audio bitstream.

18. The method of claim 15, wherein, in case the multi-user bitstream flag indicates 1, the VR-AR characteristic information includes information on whether or not imaging is applied to the multi-user bitstream, and wherein, in case information on whether or not imaging is applied to the multi-user bitstream indicates 1, imaging based on a location of each multi-user is applied to the multi-user bitstream.

19. An audio data reproducing method performed by an audio reproducing device, the audio data reproducing method comprising:

collecting information on a reproduction environment of the audio reproducing device;

transmitting the collected information on a reproduction environment to an audio processing device;

receiving an audio signal being generated by processing an audio bitstream, by an audio processing device, based on the information on a reproduction environment and an info frame being generated, by the audio processing device, based on characteristic information of the generated audio signal, from the audio processing device; and reproducing the received audio signal based on the info frame, wherein the audio bitstream includes a Virtual Reality (VR) audio bitstream or an Augmented Reality (AR) audio bitstream, wherein the information on a reproduction environment includes an Extended Display Identification Data standard (EDID), and wherein the EDID includes a VR-AR audio data block which includes 3D audio signal type information for representing at least one of 3DoF, 3DoF+, or 6DoF.

20. An audio processing device processing audio data, comprising:

a receiver receiving information on a reproduction environment of an audio reproducing device from the audio reproducing device;

an audio signal processor generating an audio signal by processing an audio bitstream based on the information on reproduction environment;

a metadata processor generating an info frame including characteristic information of the generated audio signal; and a transmitter transmitting the generated audio signal and the generated info frame to the audio reproducing device, wherein the audio bitstream includes a Virtual Reality (VR) audio bitstream or an Augmented Reality (AR) audio bitstream, wherein the information on a reproduction environment includes an Extended Display Identification Data standard (EDID), and wherein the EDID includes a VR-AR audio data block which includes 3D audio signal type information for representing at least one of 3DoF, 3DoF+, or 6DoF.

* * * * *